US010725458B2

(12) United States Patent
Matsuyama

(10) Patent No.: US 10,725,458 B2
(45) Date of Patent: Jul. 28, 2020

(54) LIFE PREDICTION DEVICE

(71) Applicant: Mitsubishi Electric Corporation, Tokyo (JP)

(72) Inventor: Hiroki Matsuyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/322,971

(22) PCT Filed: Oct. 20, 2016

(86) PCT No.: PCT/JP2016/081146
§ 371 (c)(1),
(2) Date: Feb. 4, 2019

(87) PCT Pub. No.: WO2018/073943
PCT Pub. Date: Apr. 26, 2018

(65) Prior Publication Data
US 2019/0179293 A1   Jun. 13, 2019

(51) Int. Cl.
G06F 11/00   (2006.01)
G05B 19/418  (2006.01)
(Continued)

(52) U.S. Cl.
CPC ....... *G05B 19/4184* (2013.01); *G05B 13/048* (2013.01); *G05B 23/0283* (2013.01);
(Continued)

(58) Field of Classification Search
CPC .............. G05B 19/4184; G05B 13/048; G05B 23/0283; G05B 2219/32194; G05B 2219/32234
(Continued)

(56) References Cited

U.S. PATENT DOCUMENTS 9,163,849 B2 * 10/2015 Scott ......................... F24F 11/77
9,506,821 B1 * 11/2016 Robillard ............... G01K 11/00
(Continued)

FOREIGN PATENT DOCUMENTS

EP   2031948 A2    3/2009
JP   H08-285422 A  11/1996
(Continued)

OTHER PUBLICATIONS

Analog Devices, Thermal Design Basics, 2009, MT-093 Tutorial, 13 pp. (Year: 2009).*
(Continued)

Primary Examiner — Toan M Le
Assistant Examiner — Xiuqin Sun
(74) Attorney, Agent, or Firm — Xsensus LLP

(57) ABSTRACT

A CPU unit is a life prediction device for a fan. The CPU unit includes a temperature calculation unit to calculate internal temperature of the CPU unit on the basis of at least one of the utilization of the CPU unit, the temperature a CPU, and the rotation speed of the fan; and a storage unit to store fan life data that indicates the life of the fan relative to temperature. A control unit includes a life prediction unit to calculate remaining life expectancy of the fan on the basis of the fan life data and the internal temperature calculated by the temperature calculation unit.

9 Claims, 20 Drawing Sheets

(51) Int. Cl.
*G05B 13/04* (2006.01)
*G05B 23/02* (2006.01)

(52) U.S. Cl.
CPC .............. *G05B 2219/32194* (2013.01); *G05B 2219/32234* (2013.01)

(58) Field of Classification Search
USPC ......................................................... 702/184
See application file for complete search history.

(56) References Cited

U.S. PATENT DOCUMENTS

| | | | | |
|---|---|---|---|---|
| 2006/0074585 | A1* | 4/2006 | Reinberg | G01K 7/425 702/130 |
| 2009/0063057 | A1* | 3/2009 | Miettinen | H05K 7/20945 702/34 |
| 2015/0193325 | A1* | 7/2015 | Harsan-Farr | G06F 11/008 702/186 |
| 2017/0231071 | A1* | 8/2017 | Elinsenberg | H05B 37/03 |
| 2018/0183379 | A1* | 6/2018 | Yokoyama | H02P 27/08 |

FOREIGN PATENT DOCUMENTS

| | | |
|---|---|---|
| JP | 2001-0091413 A | 4/2001 |
| JP | 2007-041739 A | 2/2007 |
| JP | 2013-115392 A | 6/2013 |
| JP | 2016-122312 A | 7/2016 |
| JP | 2016-124648 A | 7/2016 |

OTHER PUBLICATIONS

International Search Report dated Jan. 24, 2017 for PCT/JP2016/081146 filed on Oct. 20, 2016, 6 pages including English translation.

Decision to Grant a Patent received for Japanese Patent Application No. 2017-558761, dated Jan. 23, 2018, 6 pages including English Translation.

* cited by examiner

FIG.17

| INTERNAL TEMPERATURE OF CPU UNIT (AMBIENT TEMPERATURE 「4A」) [°C] | | | | | TD-4 |
|---|---|---|---|---|---|
| CPU UTILIZATION \ FAN ROTATION SPEED | 4AA1 | 4AA2 | 4AA3… | … | |
| 4AB1 | | | | | |
| 4AB2 | | | | | |
| 4AB3 | | | | | |
| ⋮ | | | | | |
| | | | | | |

FIG.19

| INTERNAL TEMPERATURE OF CPU UNIT (AMBIENT TEMPERATURE 「5A」) [°C] CPU TEMPERATURE / CPU UTILIZATION | 5AA1 | 5AA2 | 5AA3··· | ··· | |
|---|---|---|---|---|---|
| 5AB1 | | | | | |
| 5AB2 | | | | | |
| 5AB3 | | | | | |
| ⋮ | | | | | |
| | | | | | |

FIG.21

| FAN ROTATION SPEED / CPU TEMPERATURE | 6AA1 | 6AA2 | 6AA3··· | ··· | |
|---|---|---|---|---|---|
| 6AB1 | | | | | |
| 6AB2 | | | | | |
| 6AB3 | | | | | |
| ⋮ | | | | | |
| | | | | | |

INTERNAL TEMPERATURE OF CPU UNIT (AMBIENT TEMPERATURE 「6A」) [°C]   TD-6

LIFE PREDICTION DEVICE

CROSS-REFERENCE TO RELATED APPLICATIONS

The present application is based on PCT filing PCT/JP2016/081146, filed Oct. 20, 2016, the entire contents of which being incorporated herein by reference.

FIELD

The present invention relates to a life prediction device that predicts the life of a fan in a control unit that controls a system in the field of factory automation (FA).

BACKGROUND

General systems in the field of FA are a combination of various kinds of devices. The devices that constitute the system in the field of FA are controlled by programmable controllers, which are control units that integrate control processing and information processing. Programmable controllers provided with fans, which are limited-life components, need to undergo maintenance to prevent shutdown and abnormal operation due to aging. There is however a demand for a reduction in the number of times maintenance is performed on programmable controllers. To meet this demand, a method is proposed in which the life of a fan, which is a limited-life component in an apparatus, is determined in accordance with the characteristics of each component and how the programmable controller is operated by the user (see Patent Literature 1).

CITATION LIST

Patent Literature

Patent Literature 1: Japanese Patent Application Laid-open No. 2001-91413

SUMMARY

Technical Problem

To predict the life of a fan, which is a limited-life component, the temperature of the fan needs to be measured. With the method disclosed in Patent Literature 1, the temperature of a fan, which is a limited-life component, and the remaining life expectancy thereof are calculated on the basis of the result of detection performed by the temperature sensor installed in the apparatus. To implement the method disclosed in Patent Literature 1, a temperature sensor needs to be installed in the programmable controller and thus it becomes difficult to predict the remaining life expectancy if the temperature sensor fails.

The present invention has been achieved in view of the above and an object of the present invention is to provide a life prediction device that can predict the remaining life expectancy of a limited-life component without being equipped with a temperature sensor.

Solution to Problem

In order to solve the above problems and achieve the object, an aspect of the present invention relates to a life prediction device for a fan. The life prediction device includes: a temperature calculation unit to calculate an internal temperature of an apparatus provided with the fan on a basis of at least one of a utilization of a central processing unit that performs arithmetic processing, a temperature of the central processing unit, and a rotation speed of the fan; a storage unit to store life data indicating a life of the fan relative to a temperature; and a life prediction unit to calculate a remaining life expectancy of the fan on a basis of the life data and the internal temperature calculated by the temperature calculation unit.

Advantageous Effects of Invention

The life prediction device according to the present invention produces an effect where the life prediction device can predict the remaining life expectancy of a limited-life component without being equipped with a temperature sensor.

BRIEF DESCRIPTION OF DRAWINGS

FIG. 17 is a diagram illustrating an example of temperature estimation data that indicates, for each ambient temperature, the internal temperature of a CPU unit corresponding to the utilization of a CPU and the rotation speed of a fan in a life prediction device according to a fourth embodiment.

FIG. 19 is a diagram illustrating an example of temperature estimation data that indicates, for each ambient temperature, the internal temperature of a CPU unit corresponding to the temperature of a CPU and the utilization of the CPU in a life prediction device according to a fifth embodiment.

FIG. 21 is a diagram illustrating an example of temperature estimation data that indicates, for each ambient temperature, the internal temperature of a CPU unit corresponding to the temperature of a CPU and the rotation speed of a fan in a life prediction device according to a sixth embodiment.

DESCRIPTION OF EMBODIMENTS

Life prediction devices according to embodiments of the present invention will be described below in detail with reference to the drawings. This invention is not limited to the embodiments.

First Embodiment

Figure 1:
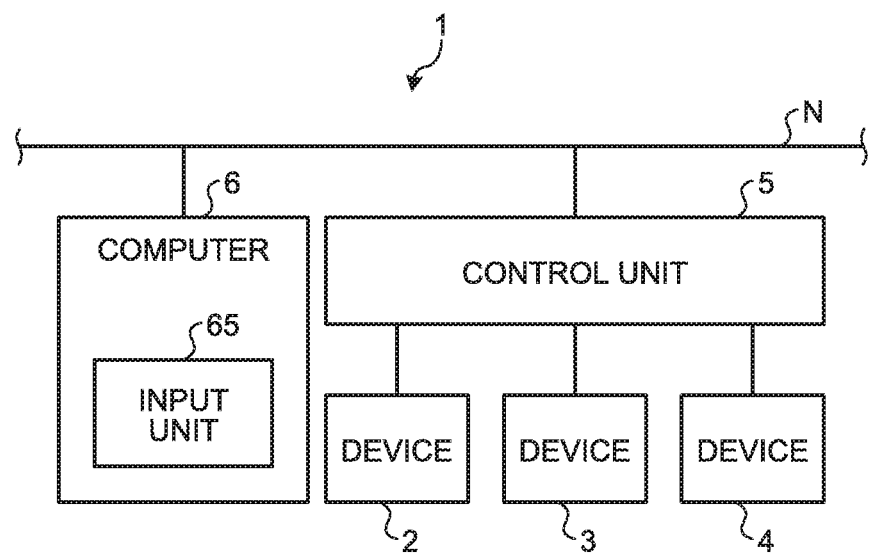
FIG. 1 is a diagram illustrating a configuration of a control system that includes a control unit that constitutes a life prediction device according to a first embodiment.

FIG. 1 is a diagram illustrating a configuration of a control system that includes a control unit that constitutes a life prediction device according to a first embodiment. A control system 1 constitutes a system in the field of factory automation (FA) for automating factories. As illustrated in FIG. 1, the control system 1 includes a plurality of devices 2, 3, and 4 installed in the system; a control unit 5 connected to the devices 2, 3, and 4; and a computer 6 connected to the control unit 5 via a network N. In the first embodiment, the control system 1 includes three devices 2, 3, and 4, but the number of such devices is not limited to three. In the first embodiment, the devices 2, 3, and 4 are sensors or driving devices. The devices 2, 3, and 4 that are sensors are not limited to those for detecting a flow rate, pressure, concentration, or temperature installed in the system. The devices 2, 3, and 4 that are driving devices are not limited to those operating as a switch, a regulating valve, a solenoid valve, a motor, or a pump installed in the system.

The computer 6 creates a control program to be executed by the control unit 5 and transmits the control program to the control unit 5. The control unit 5 executes the control program to control the devices 2, 3, and 4. In the first embodiment, the control unit 5 is a programmable controller (programmable logic controller (PLC)). The programmable controller executes the control program to control the devices 2, 3, and 4. The programmable controller is, for example, one as defined in Japanese Industrial Standards (JIS) B 3502: 2011.

The computer 6 is an engineering tool used in the system in the field of FA and includes an input unit 65 as illustrated in FIG. 1. The input unit 65 receives user's input operations and external information. In the first embodiment, the input unit 65 includes a keyboard, a mouse, and an external recording-medium reading device that reads information recorded in an external recording medium; however, the input unit 65 is not limited thereto. The computer 6 communicates with the control unit 5 via the network N, which is a computer network that communicably connects the computer 6 and the control unit 5. In the first embodiment, the network N is a local area network (LAN) installed in the FA system; however, the network N is not limited thereto.

Figure 2:
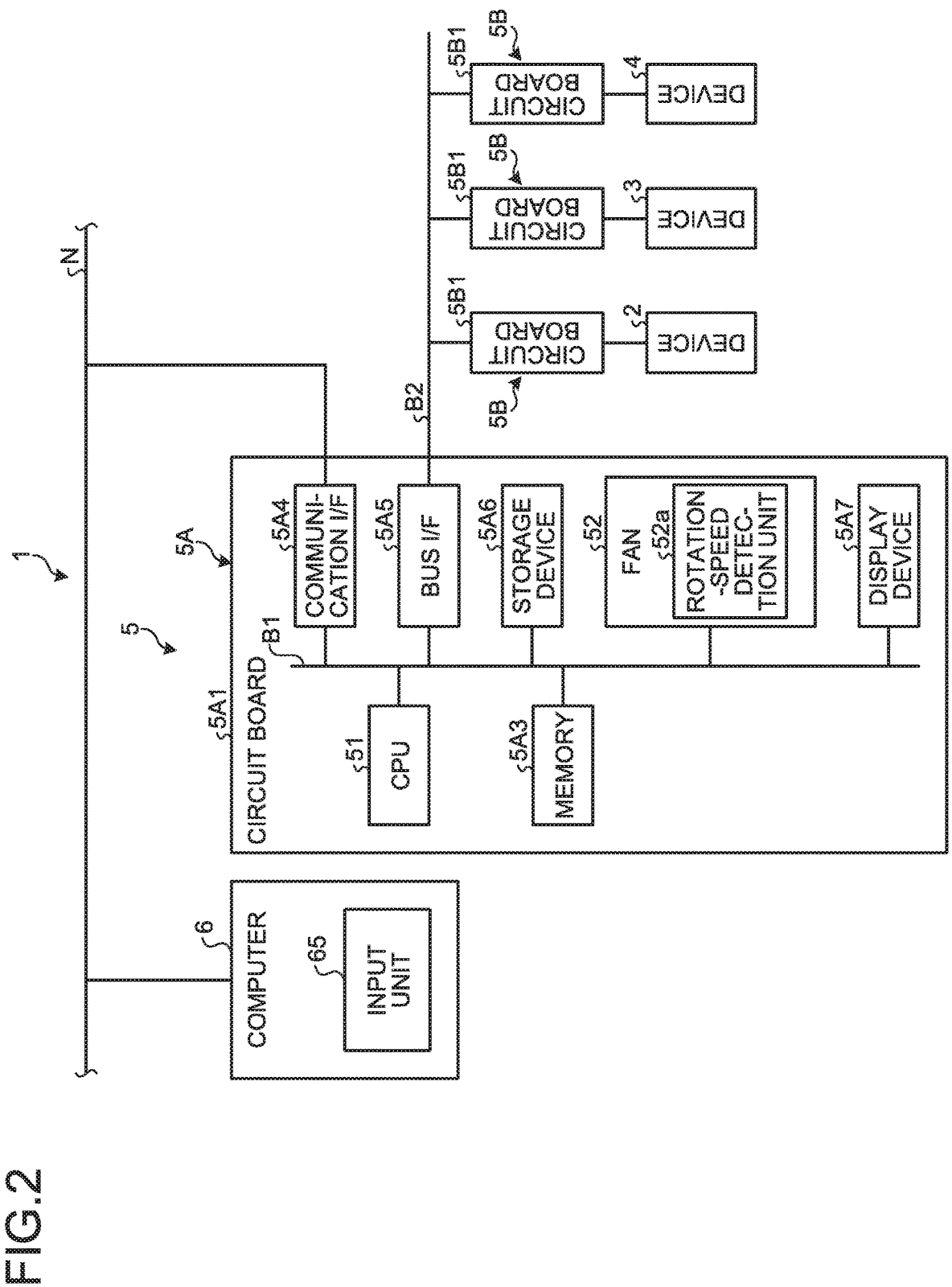
FIG. 2 is a diagram illustrating the hardware configuration of the control unit that constitutes the life prediction device according to the first embodiment.

Next, the hardware configuration of the control unit 5 will be described. FIG. 2 is a diagram illustrating the hardware configuration of the control unit that constitutes the life prediction device according to the first embodiment. As illustrated in FIG. 2, the control unit 5 includes a central-processing-unit (CPU) unit 5A that processes and executes the control program and input/output (I/O) units 5B connected to the devices 2, 3, and 4. In the first embodiment, the three I/O units 5B are connected to the devices 2, 3, and 4 on a one-to-one basis, respectively. The I/O units 5B each include at least a circuit board 5B1; a memory (not illustrated) that is mounted on the circuit board 5B1 and stores a computer program; and a CPU (not illustrated) that executes the computer program stored in the memory. The computer program stored in the memory is a program for controlling the device 2, 3, or 4 in accordance with the instructions from the CPU unit 5A.

The CPU unit 5A includes a circuit board 5A1; a CPU 51 that is mounted on the circuit board 5A1 and executes a control program; and a memory 5A3 connected to the CPU 51 via an internal bus B1. The CPU 51 is a central processing unit that controls the control unit 5. The CPU 51 detects the utilization of the CPU 51. The utilization of the CPU 51 is the proportion of time that the CPU 51 spends executing some processing per unit time. The CPU 51 estimates the temperature of the CPU 51 on the basis of the utilization of the CPU 51. Examples of the unit time include one hour, one day, and one scanning time period.

The CPU unit 5A includes a communication interface 5A4 for communication with the computer 6; a bus interface 5A5 connected to the I/O units 5B; a storage device 5A6 that stores the control program and the computer program for calculating remaining life expectancy LE of a fan 52; the fan 52; and a display device 5A7. The CPU 51, the memory 5A3, the communication interface 5A4, the bus interface 5A5, the storage device 5A6, the fan 52, and the display device 5A7 are connected with one another via the internal bus B1.

The bus interface 5A5 is a bus bridge circuit that connects the internal bus B1 and an expansion bus B2. The bus interface 5A5 is connected to the I/O units 5B via the expansion bus B2. In the first embodiment, the storage device 5A6 is a solid state drive (SSD) or a hard disk drive (HDD); however, the storage device 5A6 is not limited thereto.

The control program and the computer program for calculating the remaining life expectancy LE are implemented in software, firmware, or a combination of software and firmware. The memory 5A3 is constituted by a non-volatile semiconductor memory or a volatile semiconductor memory. Examples of a non-volatile semiconductor memory or a volatile semiconductor memory include a random access memory (RAM), a read only memory (ROM), and a flash memory. The memory 5A3 may be constituted by a magnetic disk or the like.

The fan 52 dissipates heat in the CPU unit 5A, which is mainly generated by the CPU 51, to the outside. The fan 52 is a limited-life component. The fan 52 includes blades that are rotated by a motor and a rotation-speed detection unit 52a that detects the rotation speed of the blades. The rotation speed of the blades is equivalent to the rotation speed of the fan 52. The rotation-speed detection unit 52a is constituted by an optical detection sensor or a magnetic sensor. The rotation-speed detection unit 52a may detect the rotation speed of the fan 52 on the basis of the value of the current flowing in the motor or the period of time for which the current flows.

The display device 5A7 is constituted by a liquid crystal display (LCD), an organic electro-luminescence display (OELD), or an inorganic electro-luminescence display (IELD). The display device 5A7 displays the remaining life expectancy LE of the fan 52 and a warning to indicate that the fan 52 needs maintenance.

Figure 3:
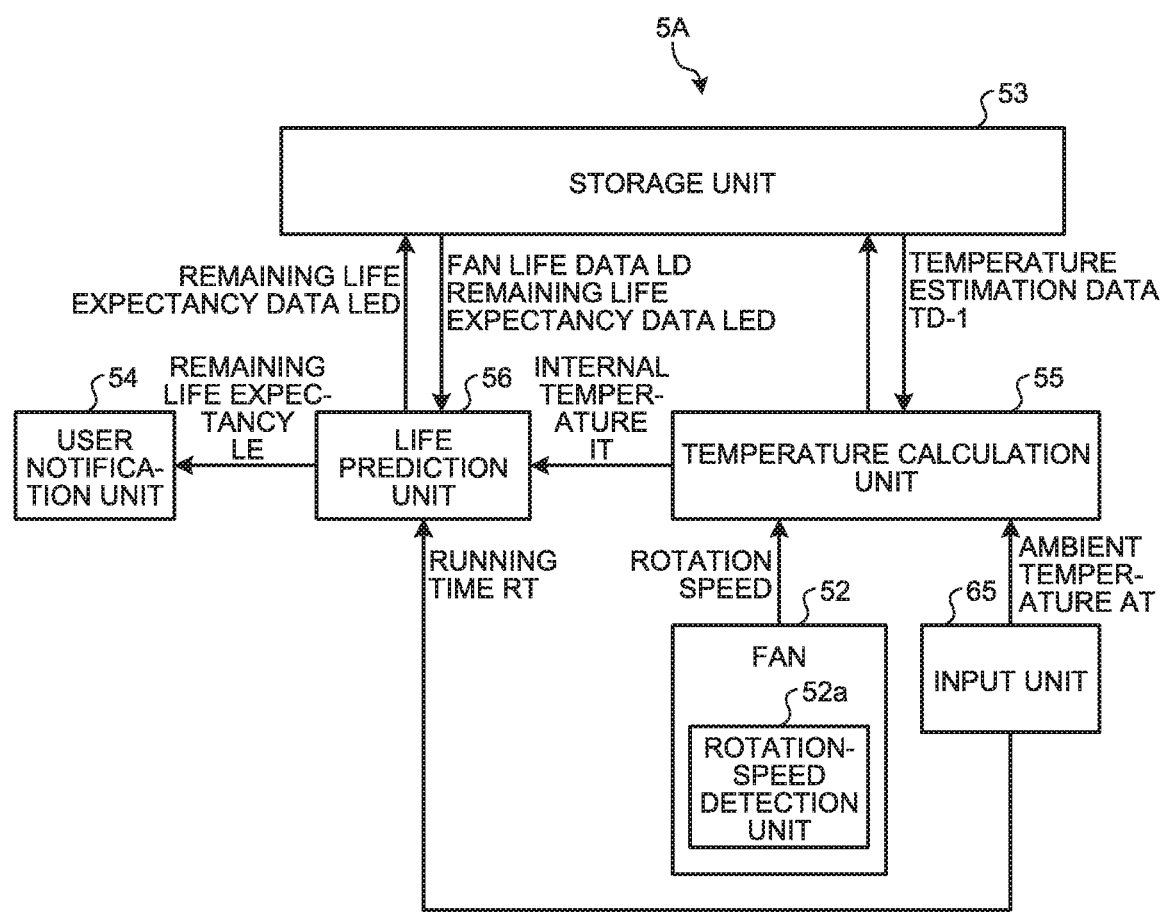
FIG. 3 is a functional block diagram of the life prediction device according to the first embodiment.

In the first embodiment, the control unit 5 executes the control program so as to obtain and store information on the devices 2, 3, and 4 and to control the operations of the devices 2, 3, and 4. In the first embodiment, the CPU unit 5A in the control unit 5 is a life prediction device that calculates the remaining life expectancy LE of the fan 52. The CPU 51 in the CPU unit 5A is a central processing unit that executes arithmetic processing performed in the CPU unit 5A. As illustrated in FIG. 3, the input unit 65 is connected to the CPU unit 5A, which is the life prediction device according to the first embodiment. As illustrated in FIG. 3, the CPU unit 5A, which is the life prediction device, includes a storage unit 53 that stores the control program; a user notification unit 54 that displays the remaining life expectancy LE; a temperature calculation unit 55 that calculates internal temperature IT of the CPU unit 5A provided with the fan 52; and a life prediction unit 56 that calculates the remaining life expectancy LE of the fan 52.

In the specification, the term "life" indicates the service life from the start of use of the fan 52, as indicated by the manufacturer of the fan 52, and the remaining life expectancy IF indicates the remaining period of time after the start of use of the fan 52 for which the fan 52 can still be used.

The temperature calculation unit 55 calculates the internal temperature IT of the CPU unit 5A on the basis of at least one of the utilization of the CPU 51, the temperature of the CPU 51, and the rotation speed of the fan 52. In the first embodiment, when the control program for the control system 1 is debugged, the control program is tested, or the control system 1 is operated, the CPU 51 stores the utilization of the CPU 51 in the storage unit 53. Testing the control program means executing the control program without actually operating the devices 2, 3, and 4. Hereinafter, the rotation speed of the fan 52 means the number of rotations of the fan 52 per unit time.

The temperature calculation unit 55 receives, via the I/O units 5B connected to the temperature sensor, an ambient temperature AT, which is the temperature outside the CPU unit 5A, i.e., the external temperature of the CPU unit 5A, detected by the temperature sensor, and it also receives the rotation speed of the fan 52, which is detected by the rotation-speed detection unit 52a of the fan 52. Upon receiving the utilization of the CPU 51 and the ambient temperature AT, the temperature calculation unit 55 accesses the storage unit 53 and calculates the internal temperature IT of the CPU unit 5A on the basis of the utilization of the CPU 51, the ambient temperature AT, and temperature estimation data TD-1, which is stored in the storage unit 53 and is exemplified in FIGS. 4, 5, and 6.

Figure 4:
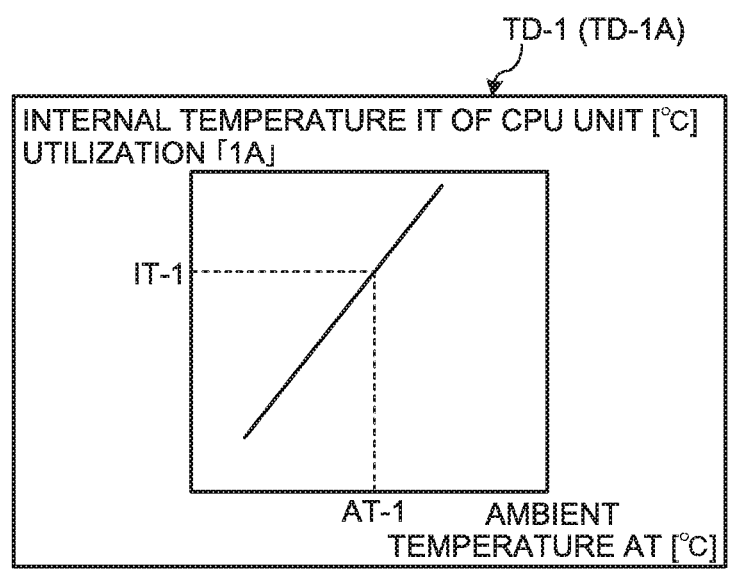
FIG. 4 is a diagram illustrating temperature estimation data indicating the internal temperature of a CPU unit when the utilization of a CPU of the life prediction device according to the first embodiment is "1A".
Figure 5:
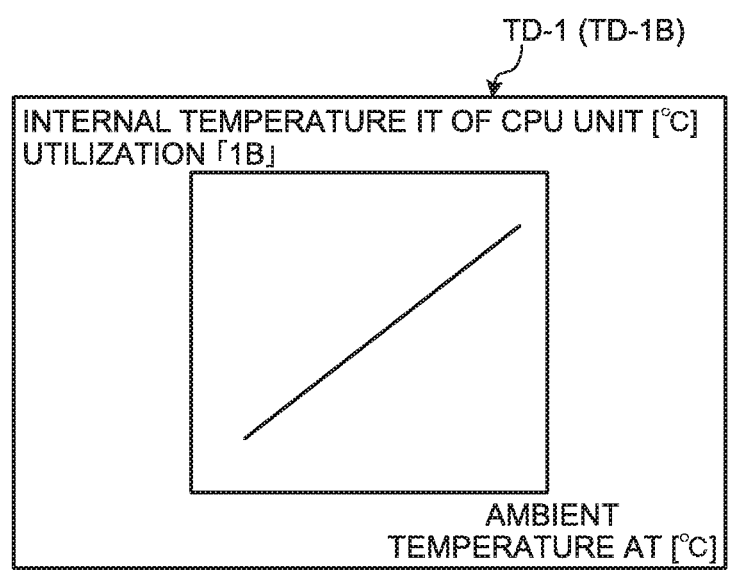
FIG. 5 is a diagram illustrating temperature estimation data indicating the internal temperature of the CPU unit when the utilization of the CPU of the life prediction device according to the first embodiment is "1B".
Figure 6:
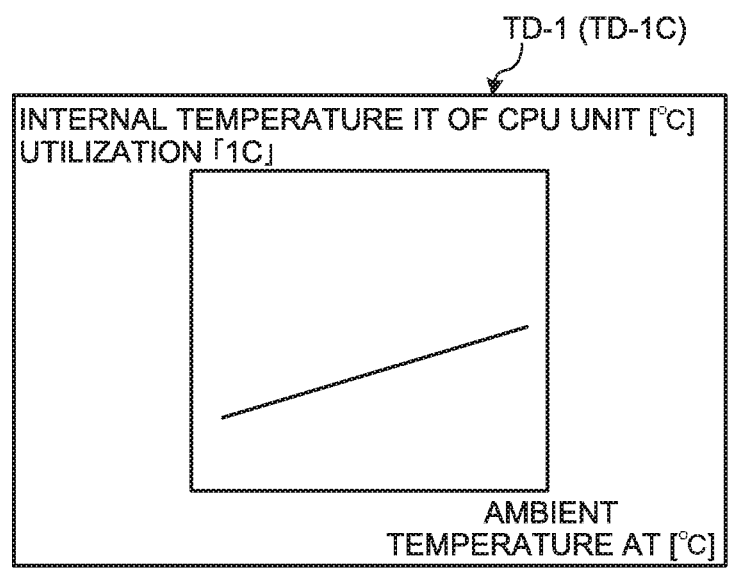
FIG. 6 is a diagram illustrating temperature estimation data indicating the internal temperature of the CPU unit when the utilization of the CPU of the life prediction device according to the first embodiment is "1C".

The temperature estimation data TD-1, which is stored in the storage unit 53 and is exemplified in FIGS. 4, 5, and 6, is a data sheet representing a first relationship that is the relationship between the ambient temperature AT and the internal temperature IT of the CPU unit 5A for each utilization of the CPU 51. The present embodiment exemplifies data for utilization 1A (FIG. 4), data for utilization 1B (FIG. 5), and data for utilization 1C (FIG. 6); however, the utilization is not limited thereto. The temperature estimation data TD-1 for the utilization 1A is indicated by the symbol TD-1A, the temperature estimation data TD-1 for the utilization is indicated by the symbol TD-1B, and the temperature estimation data TD-1 for the utilization 1C is indicated by the symbol TD-1C in order to distinguish the utilizations when necessary. In the first embodiment, the temperature estimation data TD-1A, TD-1B, and TD-1C are pieces of data generated by actually measuring the internal temperature IT of the housing of the CPU unit 5A. In the first embodiment, the temperature estimation data TD-1A, TD-1B, and TD-1C are stored in the storage unit 53 when the CPU unit 5A is shipped. In the present invention, however, the utilization of the CPU 51, the ambient temperature AT, and the internal temperature IT may be collected when the CPU unit 5A starts operating, and then data as exemplified in FIGS. 4 to 6 may be automatically generated by the CPU 51 and stored in the storage unit 53.

When the CPU unit 5A calculates the remaining life expectancy LE of the fan 52, first, the temperature calculation unit 55 calculates the internal temperature IT of the CPU unit 5A. To calculate the internal temperature IT of the CPU unit 5A, the temperature calculation unit 55 selects, from among the temperature estimation data TD-1A, TD-1B, and TD-1C stored in the storage unit 53 and exemplified in FIGS. 4 to 6, the temperature estimation data TD-1 at the utilization of the CPU 51 closest to the utilization of the CPU 51 when the control program stored in the storage unit 53 is debugged, when the control program is tested, or when the control system 1 is operated. Instead of selecting, from among the temperature estimation data TD-1A, TD-1B, and TD-1C, the temperature estimation data TD-1 at the utilization of the CPU 51 closest to the utilization of the CPU 51 stored in the storage unit 53, the temperature calculation unit 55 may select, from among the temperature estimation data TD-1A, TD-1B, and TD-1C stored in the storage unit 53 and exemplified FIGS. 4 to 6, two or more pieces of temperature estimation data at the utilization close to the utilization of the CPU 51, may calculate the arithmetic mean or geometric mean of the selected two or more pieces of temperature estimation data TD-1 to obtain new temperature estimation data TD-1', and may store the temperature estimation data TD-1' in the storage unit 53.

The temperature calculation unit 55 uses the ambient temperature AT as well as the selected temperature estimation data TD-1 or the newly calculated temperature estimation data TD-1' to calculate the internal temperature IT of the CPU unit 5A, which indicates the temperature inside the unit. In this manner, in the first embodiment, the temperature calculation unit 55 selects the temperature estimation data TD-1 or newly calculates the temperature estimation data TD-1' on the basis of the utilization of the CPU 51 and calculates the internal temperature IT of the CPU unit 5A on the basis of, in addition to the utilization of the CPU 51, the ambient temperature AT and the selected temperature estimation data TD-1 or the newly calculated temperature estimation data TD-1'. The temperature calculation unit 55 outputs the calculated internal temperature IT of the CPU unit 5A to the life prediction unit 56. Because the temperature calculation unit 55 calculates the internal temperature IT of the CPU unit 5A that is affected by the power device, the heatsink, and the arrangement of the components in the CPU unit 5A, the internal temperature IT of the CPU unit 5A calculated by the temperature calculation unit 55 takes the power device, the heatsink, and the arrangement of the components in the CPU unit 5A into consideration.

Figure 7:
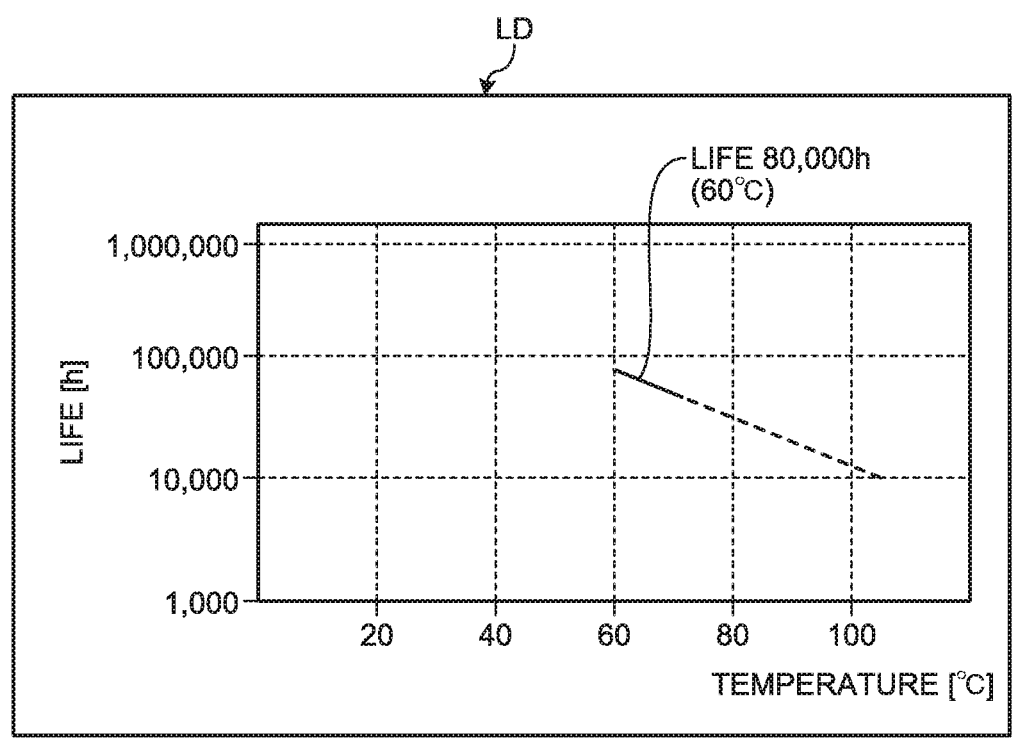
FIG. 7 as a diagram illustrating an example of fan life data relative to the internal temperature of the CPU unit of the life prediction device according to the first embodiment.

When the CPU unit 5A calculates the remaining life expectancy LE of the fan 52, the life prediction unit 56 calculates the life of the fan 52 on the basis of the internal temperature IT of the CPU unit 5A calculated by the temperature calculation unit 55 and fan life data LD illustrated in FIG. 7 and stored in the storage unit 53. The fan life data LD illustrated in FIG. 7 and stored in the storage unit 53 is life data indicating the life of the fan 52 relative to the internal temperature IT of the CPU unit 5A. The fan life data LD is input to the storage unit 53 via the life prediction unit 56 and is stored in the storage unit 53. The fan life data LD represents the relationship between the internal temperature IT of the CPU unit 5A and the life of the fan 52 and indicates that the life of the fan 52 changes in accordance with the change of the internal temperature IT of the CPU unit 5A. As illustrated in FIG. 7, the fan life data LD in the first embodiment indicates that the life of the fan 52 is 80,000 hours at a temperature of 60° C. under a certain environment and becomes shorter as the temperature rises above 60° C.

Upon receiving the internal temperature IT of the CPU unit 5A, the life prediction unit 56 calculates, on the basis of the fan life data LD, the life of the fan 52 at the internal temperature IT of the CPU unit 5A calculated by the temperature calculation unit 55. For the CPU unit 5A to calculate the remaining life expectancy LE of the fan 52, the life prediction unit 56 then calculates the ratio of running time RT of the control unit 5 to the life of the fan 52. To calculate the ratio of the running time RT to the life of the fan 52, upon receiving the running time RT of the control unit 5 in the control system 1 from the input unit 65 in the computer 6, the life prediction unit 56 divides the running time RT of the control unit 5 in the control system 1 input from the input unit 65 in the computer 6 by the life of the fan 52.

The life prediction unit 56 in the CPU unit 5A then calculates the remaining life expectancy LE of the fan 52 after execution of an operation by using the ratio of the running time RT to the life of the fan 52. To calculate the remaining life expectancy LE of the fan 52, the life prediction unit 56 reads remaining life expectancy data LED stored in the storage unit 53. The remaining life expectancy data LED stored in the storage unit 53 indicates the remaining life expectancy LE of the fan 52. The remaining life expectancy data LED is a value that indicates the ratio of the remaining life expectancy LE to the life of the fan 52 in an unused state, where the unused state is taken as 100%. In the first embodiment, the storage unit 53 has a memory area in which the remaining life expectancy data LED can be stored, and the life prediction unit 56 overwrites the remaining life expectancy data LED calculated by itself into the memory area of the storage unit 53.

The life prediction unit 56 subtracts the ratio of the running time RT to the life of the fan 52 from the ratio of the remaining life expectancy LE to the life of the fan 52, indicated by the remaining life expectancy data LED, to calculate the ratio of the remaining life expectancy LE to the life of the fan 52 after execution of an operation, i.e., the remaining life expectancy data LED is recalculated.

Figure 8:
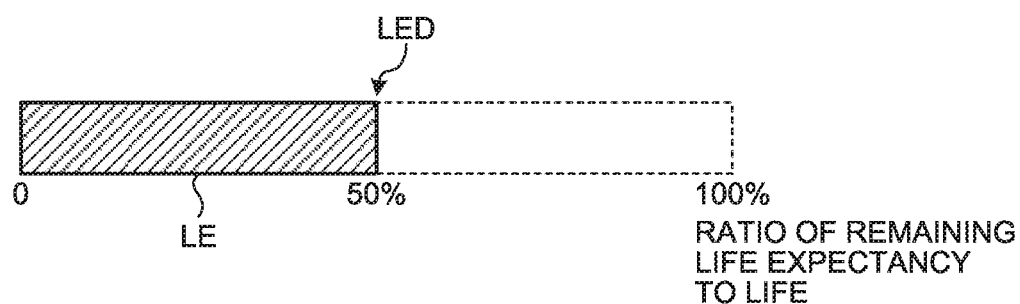
FIG. 8 is a diagram illustrating an example of remaining life expectancy indicated by remaining life expectancy data stored in a storage unit of the life prediction device according to the first embodiment.
Figure 9:
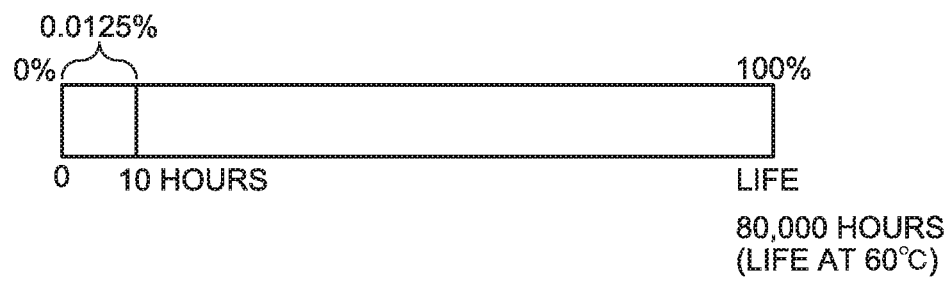
FIG. 9 is a diagram illustrating an example of the ratio of running time to the life calculated by a life prediction unit of the life prediction device according to the first embodiment.
Figure 10:
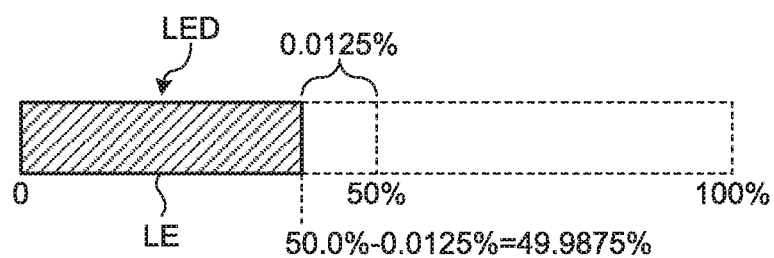
FIG. 10 is a diagram illustrating an example of the ratio of the remaining life expectancy to the life calculated by the life prediction unit of the life prediction device according to the first embodiment.

In the first embodiment, as illustrated in FIG. 7, the life of the fan 52 when the internal temperature IT of the CPU unit 5A is 60° C. is 80,000 hours. When the remaining life expectancy data LED indicates that the ratio of the remaining life expectancy LE to the life of the fan 52 is 50% as illustrated in FIG. 8 and the running time RT is 10 hours, the life prediction unit 56 calculates, as a percentage, that the ratio of 10 hours, which is the running time RT, to 80,000 hours, which is the life of the fan 52, is 0.0125%, as illustrated in FIG. 9. When the ratio of the running time RT to the life of the fan 52 is calculated, the life of the fan 52 is taken as 100%. In this case, the life prediction unit 56 calculates the ratio of the remaining life expectancy LE to the life of the fan 52 after execution of an operation lasting for the running time RT as 50.0%−0.0125%=49.9875%, as illustrated in FIG. 10. The life prediction unit 56 stores, in the storage unit 53, the ratio of the remaining life expectancy LE to the life of the fan 52 after execution of an operation lasting for the running time RT as the recalculated remaining life expectancy data LED. In FIGS. 8 and 10, the remaining life expectancy LE is indicated by parallel diagonal hatching.

The life prediction unit 56 multiplies the life of the fan 52 by the ratio of the remaining life expectancy LE to the life of the fan 52 after execution of an operation to calculate the remaining life expectancy LE after execution of an operation. When the ratio of the remaining life expectancy LE to the life of the fan 52 after execution of an operation is 49.9875% and the internal temperature IT of the CPU unit 5A is 60° C., the life prediction unit 56 calculates the remaining life expectancy LE after execution of an operation as 39,990 hours because the life of the fan 52 is 80,000 hours. The life prediction unit 56 transmits the remaining life expectancy LE of the fan 52 after execution of an operation to the user notification unit 54. In the present invention, the life prediction unit 56 may transmit the ratio of the remaining life expectancy LE to the life of the fan 52 after execution of an operation to the user notification unit 54.

The user notification unit 54 is provided on the outer surface of the housing of the CPU unit 5A and displays the remaining life expectancy LE received from the life prediction unit 56. The user notification unit 54 may display the ratio of the remaining life expectancy LE to the life of the fan 52. In the example in the first embodiment, the life prediction unit 56 calculates the remaining life expectancy LE in the case when the fan 52 rotates for the running time RT at a predetermined rotation speed and, in the present invention, the remaining life expectancy LE is calculated after the running time RT is corrected in accordance with the rotation speed of the fan 52.

The functions of the temperature calculation unit 55 and the life prediction unit 56 are implemented by the CPU 51 reading and executing the computer program that is stored in the storage device 5A6 and is used for calculating the remaining life expectancy LE. The function of the storage unit 53 is implemented by the storage device 5A6. The function of the user notification unit 54 is implemented by the display device 5A7.

Figure 11:
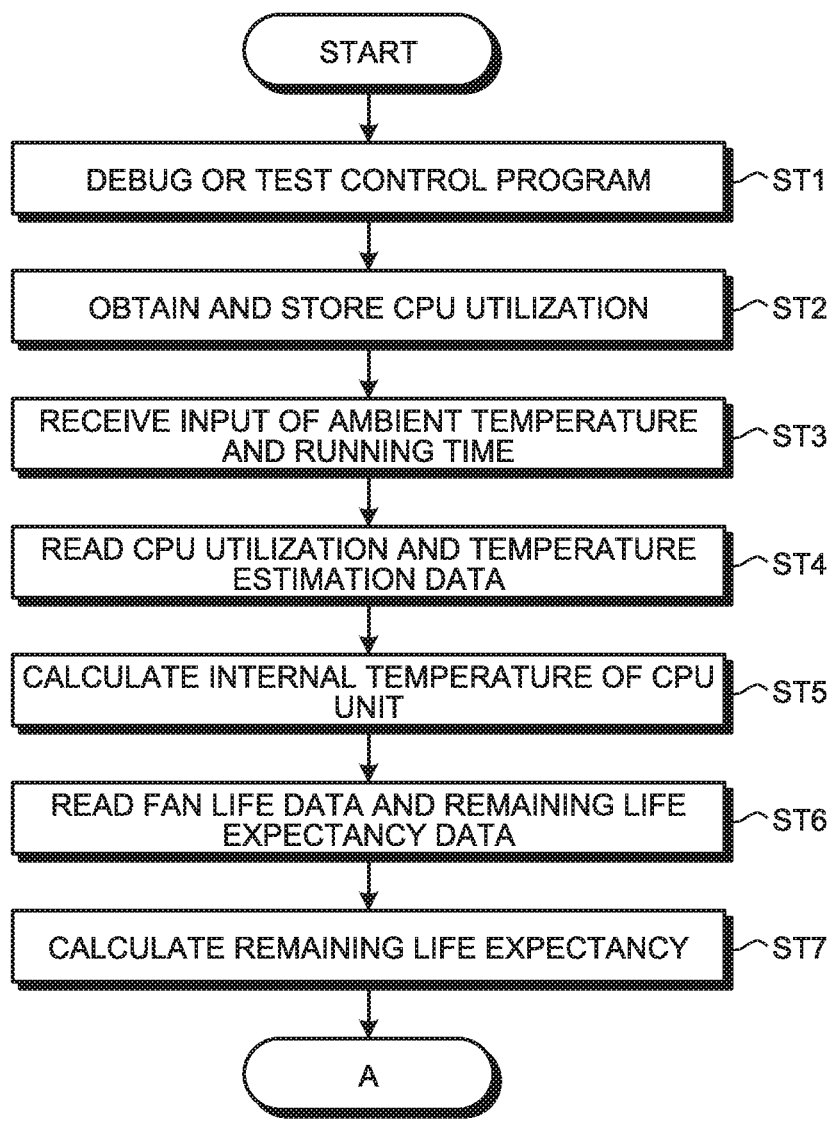
FIG. 11 is a flowchart illustrating an example of the operation for calculating the remaining life expectancy of a fan performed by the CPU in the CPU unit, which is the life prediction device according to the first embodiment.
Figure 12:
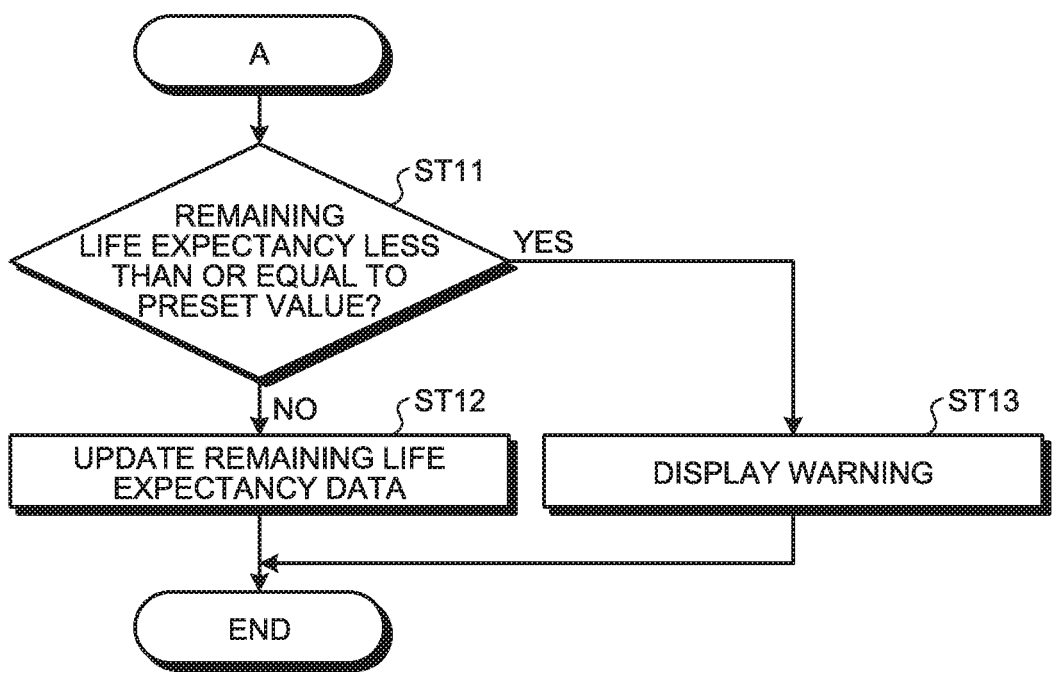
FIG. 12 is a flowchart illustrating an example of the processing executed by the CPU in response to the remaining life expectancy calculated in accordance with the flowchart illustrated in FIG. 11.

Next, a description will be given, with reference to the drawings, of an example of the operation of the CPU 51 in the CPU unit 5A, which is the life prediction device according to the first embodiment. FIG. 11 is a flowchart illustrating an example of the operation for calculating the remaining life expectancy of the fan performed by the CPU in the CPU unit, which is the life prediction device according to the first embodiment. FIG. 12 is a flowchart illustrating an example or the processing executed by the CPU in response to the remaining life expectancy calculated in accordance with the flowchart illustrated in FIG. 11.

After the CPU 51 in the CPU unit 5A finishes the processing in accordance with the flowchart illustrated in FIG. 11 and before the CPU 51 executes the control program to control the devices 2, 3, and 4, the CPU 51 executes processing in accordance with the flowchart illustrated in FIG. 12. The CPU 51 in the CPU unit 5A debugs or tests the control program (step ST1). The CPU 51 in the CPU unit 5A obtains the utilization of the CPU 51 when the control program is debugged or tested or when the control system 1 is operated, and then it stores the utilization in the storage unit 53 (step ST2). In the first embodiment, the storage unit 53 has a memory area in which the utilization of the CPU 51 can be stored, and the CPU 51 overwrites the utilization of the CPU 51 into the memory area of the storage unit 53.

The CPU 51 in the CPU unit 5A receives input of the ambient temperature AT via the I/O units 5B connected to the temperature sensor, receives the running time RT input via the input unit 65 in the computer 6, and stores the ambient temperature AT and the running time RT in the storage unit 53 (step ST3). In the first embodiment, the storage unit 53 has a memory area in which the ambient temperature AT can be stored and also has a memory area in which the running time RT can be stored. The CPU 51 overwrites the input ambient temperature AT and running time RT into the memory areas in the storage unit 53.

The CPU 51 functioning as the temperature calculation unit 55 in the CPU unit 5A reads the utilization of the CPU 51 and the temperature estimation data TD-1 stored in the storage unit 53, and then it selects the temperature estimation data TD-1 at the utilization of the CPU 51 closest to the utilization of the CPU 51 stored in the storage unit 53 or calculates new temperature estimation data TD-1' (step ST4). The CPU 51 functioning as the temperature calculation unit 55 in the CPU unit 5A reads the ambient temperature AT stored in the storage unit 53 and calculates the internal temperature IT of the CPU unit 5A on the basis of the ambient temperature AT read from the storage unit 53 as well as the selected temperature estimation data TD-1 or the newly calculated temperature estimation data TD-1' (step ST5). At step ST5, when the utilization of the CPU 51 is "1A", the CPU 51 functioning as the temperature calculation unit 55 in the CPU unit 5A uses the temperature estimation data TD-1 illustrated in FIG. 4 to calculate internal temperature IT-1 of the CPU unit 5A at ambient temperature AT-1.

The CPU 51 functioning as the life prediction unit 56 in the CPU unit 5A reads the fan life data LD and the remaining life expectancy data LED from the storage unit 53 (step ST6). The CPU 51 functioning as the life prediction unit 56 in the CPU unit 5A calculates, on the basis of the fan life data LD and the remaining life expectancy data LED, the remaining life expectancy LE after execution of an operation lasting for the running time RT input from the input unit 65 and under an environment with the ambient temperature AT, which is input via the I/O units 5B connected to the temperature sensor (step ST7). The CPU 51 functioning as the life prediction unit 56 in the CPU unit 5A displays the remaining life expectancy LE on the user notification unit 54.

The CPU 51 in the CPU unit 5A determines whether the remaining life expectancy LE is less than or equal to a preset value (step ST11). In the first embodiment, the preset value indicates a value at which the fan 52 needs maintenance; however, the preset value is not limited thereto. When the CPU 51 in the CPU unit 5A determines that the remaining life expectancy LE is less than or equal to the preset value (Yes at step ST11), the CPU 51 displays, on the user notification unit 54, a warning that the remaining life expectancy LE will be less than or equal to the preset value, i.e., the fan 52 needs maintenance, after execution of an operation (step ST13), and ends the flowchart illustrated in FIG. 12. When the CPU 51 in the CPU unit 5A determines that the remaining life expectancy LE is more than the preset value (No at step ST11), the CPU 51 recalculates the remaining life expectancy data LED on the basis of the remaining life expectancy LE, stores the recalculated remaining life expectancy data LED in the storage unit 53 to update the remaining life expectancy data LED stored in the storage unit 53 (step ST12), and ends the flowchart illustrated in FIG. 12. Thereafter, the CPU 51 in the CPU unit 5A executes the control program received from the computer 6 to control the devices 2, 3, and 4.

The CPU unit 5A, which is the life prediction device according to the first embodiment, includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the utilization of the CPU 51 and also functions as the life prediction unit 56 that calculates the remaining life expectancy LE of the fan 52 on the basis of the fan life data LD and the internal temperature IT of the CPU unit 5A calculated by the temperature calculation unit 55. Thus, by receiving from the input unit 65, before the control system 1 starts operating, input of the running time RT for which the control unit 5 is scheduled to operate when the control system 1 is operated, the CPU unit 5A can calculate, before the control system 1 starts operating, the remaining life expectancy LE after execution of an operation. Consequently, the CPU unit 5A can obtain the remaining life expectancy LE of the fan 52 before the control system 1 starts operating and thus it is possible to prevent a situation where the remaining life expectancy LE of the fan 52 falls below the preset value while the control system 1 is in operation and the control system 1 stops its operation or operates abnormally. Thus, an effect is obtained where the CPU unit 5A can predict the remaining life expectancy LE of the fan 52, which is a limited-life component, based on the temperature characteristics without being equipped with a temperature sensor in the housing of the CPU unit 5A.

Moreover, the CPU 51 in the CPU unit 5A functions as the temperature calculation unit 55 that calculates the internal temperature IT of the CPU unit 5A on the basis of the utilization of the CPU 51; therefore, the CPU unit 5A can obtain the internal temperature IT of the CPU unit 5A without being equipped with a temperature sensor for detecting the internal temperature IT of the CPU unit 5A. Furthermore, the fan life data LD stored in the storage unit 53 represents the life of the fan 52 that changes in accordance with the change of the internal temperature IT of the CPU unit 5A. The CPU unit 5A calculates the life of the fan 52 on the basis of the fan life data LD that represents the life of the fan 52 that changes in accordance with the change of the internal temperature IT of the CPU unit 5A. Therefore, the CPU unit 5A can accurately calculate the life of the fan 52.

Moreover, the temperature calculation unit 55 in the CPU unit 5A calculates the internal temperature IT of the CPU unit 5A on the basis of, in addition to the utilization of the CPU 51, the ambient temperature AT outside the CPU unit 5A; therefore, the CPU unit 5A can accurately calculate the internal temperature IT of the CPU unit 5A.

Moreover, the life prediction unit 56 in the CPU unit 5A calculates, on the basis of the fan life data LD, the life of the fan 52 at the internal temperature IT of the CPU unit 5A calculated by the temperature calculation unit 55. The life prediction unit 56 calculates the ratio of the running time RT of the control unit 5 to the calculated life of the fan 52. When the fan life data LD representing the life of the fan 52 that changes in accordance with the change in temperature is used, the CPU unit 5A can calculate, as the ratio to the life of the fan 52, the running time RT of the control unit 5 every time the internal temperature IT of the CPU unit 5A changes. As a result, the CPU unit 5A can accurately calculate the remaining life expectancy LE of the fan 52 even when the internal temperature IT of the CPU unit 5A changes.

Moreover, the life prediction unit 56 in the CPU unit 5A calculates the remaining life expectancy LE of the fan 52 by using the ratio of the running time RT to the life of the fan 52. As a result, the CPU unit 5A can accurately calculate the remaining life expectancy LE of the fan 52 even when the internal temperature IT of the CPU unit 5A changes.

Moreover, the temperature calculation unit 55 in the CPU unit 5A calculates the internal temperature IT of the CPU unit 5A on the basis of the utilization of the CPU 51, the ambient temperature AT outside the CPU unit 5A, and the temperature estimation data TD-1 determined for each utilization of the CPU 51. Therefore, the CPU unit 5A can accurately calculate the internal temperature IT of the CPU unit 5A.

Moreover, the temperature calculation unit 55 in the CPU unit 5A calculates the internal temperature IT of the CPU unit 5A on the basis of the utilization of the CPU 51 when the control program is debugged or tested or when the control system 1 is operated. Therefore, the CPU unit 5A can calculate, before the control system 1 starts operating, the remaining life expectancy LE after operation of the fan 52.

Moreover, the life prediction unit 56 in the CPU unit 5A calculates the remaining life expectancy LE of the fan 52 on the basis of the running time RT received via the input unit 65 in addition to the internal temperature IT of the CPU unit 5A calculated by the temperature calculation unit 55 and the fan life data LD stored in the storage unit 53. Therefore, the CPU unit 5A can calculate, before the control system 1 starts operating, the remaining life expectancy LE of the fan 52 after execution of an operation.

Moreover, the CPU unit 5A can calculate, before the control system 1 starts operating, the remaining life expectancy LE of the fan 52 after execution of an operation, and when the calculated remaining life expectancy LE after execution of an operation is less than or equal to the preset value, the CPU unit 5A displays a warning on the user notification unit 54. Therefore, if the fan 52 is highly likely to fail during operation, the CPU unit 5A can issue a warning beforehand and thus the possibility that the system in the field of FA stops operating can be reduced.

Second Embodiment

Figure 13:
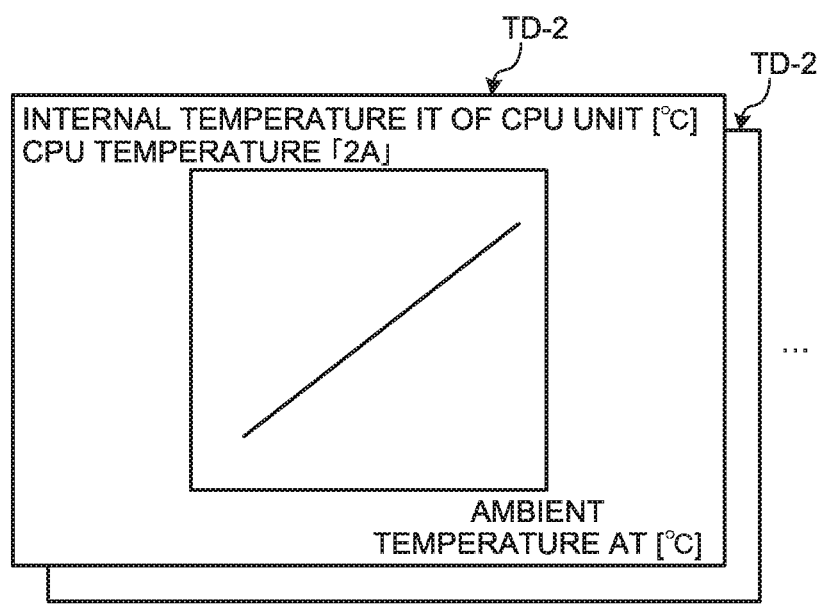
FIG. 13 is a diagram illustrating an example of temperature estimation data that indicates, for each temperature of a CPU, the internal temperature of a CPU unit relative to the ambient temperature in a life prediction device according to a second embodiment.
Figure 14:
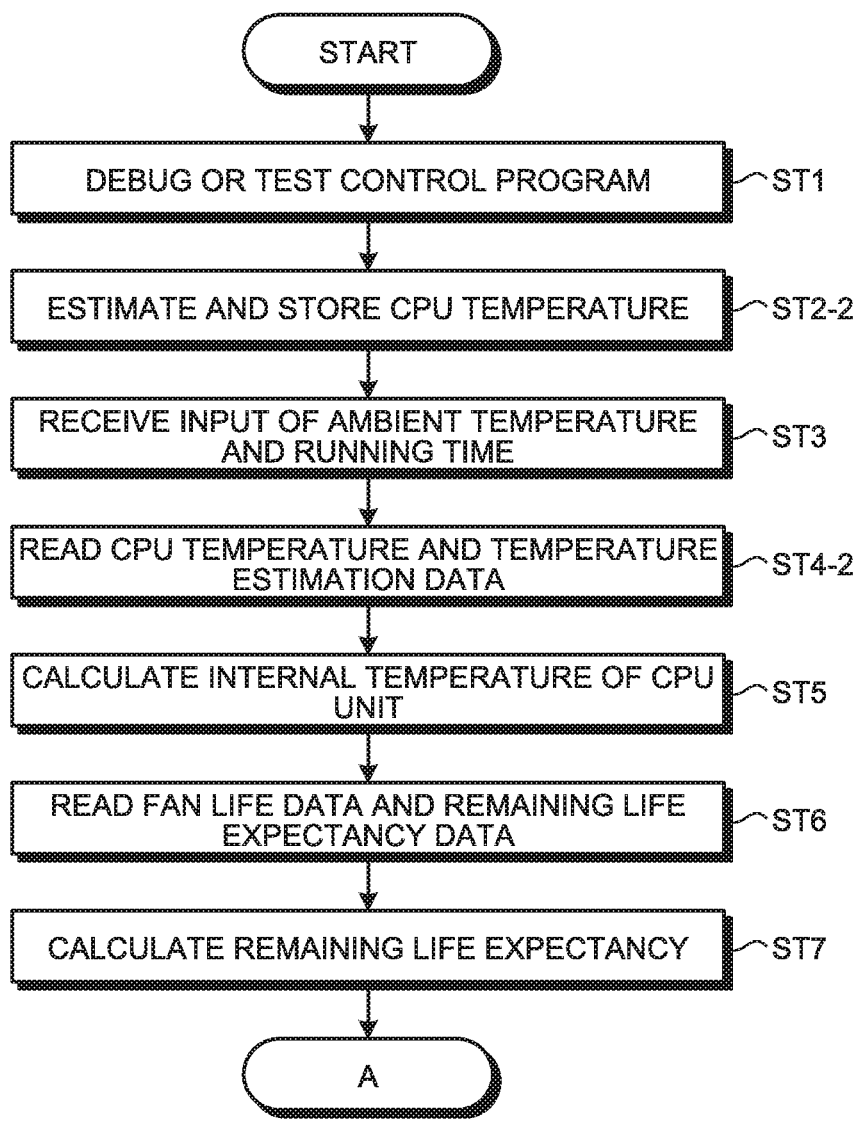
FIG. 14 is a flowchart illustrating an example of the operation for calculating the remaining life expectancy of a fan performed by the CPU in the CPU unit, which is the life prediction device according to the second embodiment.

Next, a life prediction device according to a second embodiment of the present invention will be described with reference to FIGS. 13 and 14. In FIGS. 13 and 14, the same portions as those in the first embodiment will be given the same reference numerals and a description thereof will be omitted.

The CPU unit 5A, which is the life prediction device according to the second embodiment, is the same as that in the first embodiment except for temperature estimation data TD-2 stored in the storage unit 53 and the processes at step ST2-2 and step ST4-2 illustrated in FIG. 14. The temperature estimation data TD-2 illustrated in FIG. 13 and stored in the storage unit 53 of the CPU unit 5A, which is the life prediction device according to the second embodiment, is a data sheet representing the relationship between the ambient temperature AT and the internal temperature IT of the CPU unit 5A for each temperature of the CPU 51. The present embodiment exemplifies data for temperature 2A; however, the temperature is not limited thereto. The temperature estimation data TD-2 is data generated by actually measuring the internal temperature IT of the housing of the CPU unit 5A, and at least one piece of temperature estimation data TD-2 is stored in the storage unit 53 when the CPU unit 5A is shipped. In the present invention, however, the utilization of the CPU 51, the ambient temperature AT, and the internal temperature IT may be collected when the CPU unit 5A starts operating, and then the temperature estimation data may be automatically generated by the CPU 51 and stored in the storage unit 53.

In the second embodiment, when the control program for the control system 1 is debugged, the control program is tested, or the control system 1 is operated, the CPU 51 in the CPU unit 5A stores the temperature of the CPU 51 in the storage unit 53. In the second embodiment, the temperature calculation unit 55 selects, from among a plurality of pieces of temperature estimation data TD-2 stored in the storage unit 53, the temperature estimation data TD-2 at the temperature of the CPU 51 closest to the temperature of the CPU 51 when the control program stored in the storage unit 53 is debugged, when the control program is tested, or when the control system 1 is operated. The temperature calculation unit 55 may select, from among a plurality of pieces of temperature estimation data TD-2 stored in the storage unit 53, two or more pieces of temperature estimation data TD-2 at the temperature close to the temperature of the CPU 51, may calculate the arithmetic mean or geometric mean of the selected two or more pieces of temperature estimation data TD-2 to obtain new temperature estimation data TD-2', and may store temperature estimation data TD-2' in the storage unit 53.

In the second embodiment, the temperature calculation unit 55 receives input of the ambient temperature AT via the I/O units 5B connected to the temperature sensor, and uses the received ambient temperature AT as well as the selected temperature estimation data TD-2 or the newly calculated temperature estimation data TD-2' to calculate the internal temperature IT of the CPU unit 5A, which indicates the temperature inside the unit. In this manner, in the second embodiment, the temperature calculation unit 55 selects the temperature estimation data TD-2 or newly calculates the temperature estimation data TD-2' on the basis of the temperature of the CPU 51 and calculates the internal temperature IT of the CPU unit 5A on the basis of, in addition to the temperature of the CPU 51, the ambient temperature AT and the selected temperature estimation data TD-2 or newly calculated temperature estimation data TD-2'.

In the second embodiment, the CPU 51 in the CPU unit 5A performs similar processes to those in the first embodiment except for the processes at step ST2-2 and step ST4-2. In the second embodiment, the CPU 51 in the CPU unit 5A estimates the temperature of the CPU 51 when the control program is debugged or tested or when the control system 1 is operated, and then it stores the temperature in the storage unit 53 (step ST2-2). In the second embodiment, the storage unit 53 has a memory area in which the temperature of the CPU 51 can be stored, and the CPU 51 overwrites the temperature of the CPU 51 into the memory area of the storage unit 53.

The CPU 51 in the CPU unit 5A receives input of the ambient temperature AT via the I/O units 5B connected to the temperature sensor and receives the running time RT via the input unit 65 (step ST3). Thereafter, the CPU 51 reads the temperature of the CPU 51 and the temperature estimation data TD-2 stored in the storage unit 53, and then it selects the temperature estimation data TD-2 at the temperature of the CPU 51 closest to the temperature of the CPU 51 stored in the storage unit 53 or calculates new temperature estimation data TD-2' (step ST4-2). In a similar manner to the first embodiment, the CPU 51 in the CPU unit 5A calculates the internal temperature IT of the CPU unit 5A (step ST5) and reads the fan life data LD and the remaining life expectancy data LED (step ST6). Then, the CPU 51 calculates the remaining life expectancy LE of the fan 52 (step ST7).

The CPU unit 5A according to the second embodiment includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the temperature of the CPU 51 and also functions as the life prediction unit 56 that calculates the remaining life expectancy LE of the fan 52 on the basis of the fan life data LD and the internal temperature IT of the CPU unit 5A calculated by the temperature calculation unit 55. Thus, in a similar manner to the first embodiment, by receiving from the input unit 65, before the control system 1 starts operating, input of the running time RT for which the control unit 5 is scheduled to operate when the control system 1 is operated, the CPU unit 5A can obtain, before the control system 1 starts operating, the remaining life expectancy LE of the fan 52.

Moreover, the temperature calculation unit 55 in the CPU unit 5A calculates the internal temperature IT of the CPU unit 5A on the basis of the temperature of the CPU 51, the ambient temperature AT outside the CPU unit 5A, and the temperature estimation data TD-2 determined for each temperature of the CPU 51. Therefore, the CPU unit 5A can accurately calculate the internal temperature IT of the CPU unit 5A.

Third Embodiment

Figure 15:
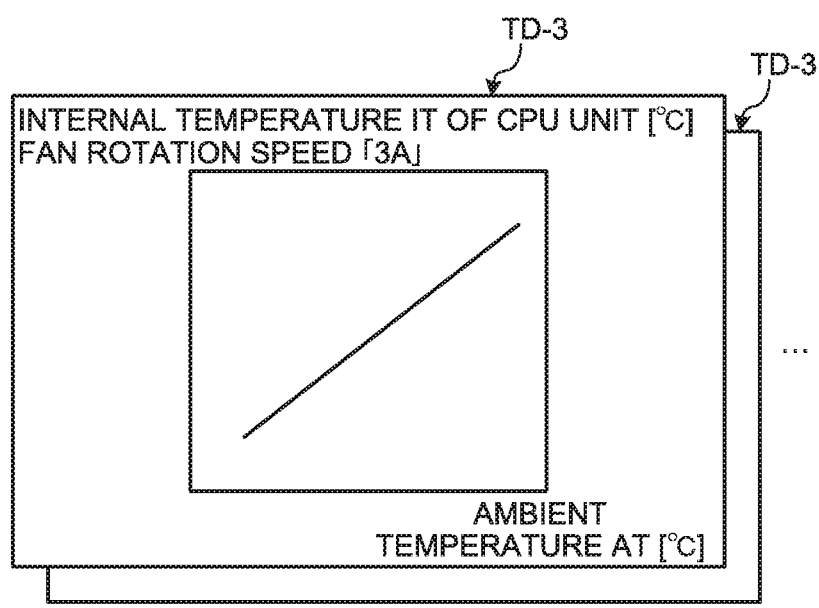
FIG. 15 is a diagram illustrating an example of temperature estimation data that indicates, for each rotation speed of a fan, the internal temperature of a CPU unit relative to the ambient temperature in a life prediction device according to a third embodiment.
Figure 16:
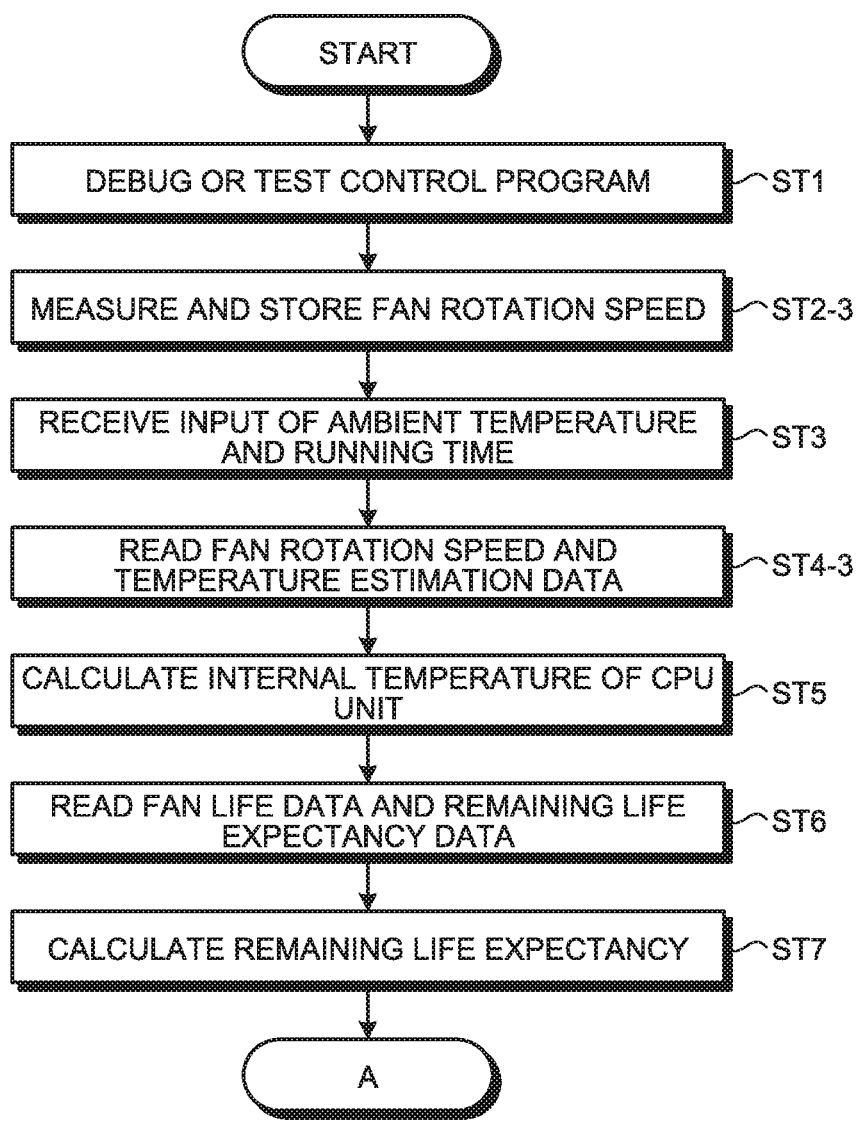
FIG. 16 is a flowchart illustrating an example of the operation for calculating the remaining life expectancy of a fan performed by a CPU in the CPU unit, which is the life prediction device according to the third embodiment.

Next, a life prediction device according to a third embodiment of the present invention will be described with reference to FIGS. 15 and 16. In FIGS. 15 and 16, the same portions as those in the first embodiment will be given the same reference numerals and a description thereof will be omitted.

The CPU unit 5A, which is the life prediction device according to the third embodiment, is the same as that in the first embodiment except for temperature estimation data TD-3 stored in the storage unit 53 and the processes at step ST2-3 and step ST4-3 illustrated in FIG. 16. The temperature estimation data TD-3 illustrated in FIG. 15 and stored in the storage unit 53 of the CPU unit 5A, which is the life prediction device according to the third embodiment, is data representing the relationship between the ambient temperature AT and the internal temperature IT of the CPU unit 5A for each rotation speed of the fan 52. The present embodiment exemplifies data for rotation speed 3A; however, the rotation speed is not limited thereto. The temperature estimation data TD-3 is data generated by actually measuring the internal temperature IT of the housing of the CPU unit 5A, and at least one piece of temperature estimation data TD-3 is stored in the storage unit 53 when the CPU unit 5A is shipped. In the present invention, however, the utilization of the CPU 51, the ambient temperature AT, and the internal temperature IT may be collected when the CPU unit 5A starts operating, and then the temperature estimation data may be automatically generated by the CPU 51 and stored in the storage unit 53.

In the third embodiment, when the control program for the control system 1 is debugged, the control program is tested, or the control system 1 is operated, the CPU 51 in the CPU unit 5A stores the rotation speed of the fan 52 in the storage unit 53. In the third embodiment, the temperature calculation unit 55 selects, from among a plurality of pieces of temperature estimation data TD-3 stored in the storage unit 53, the temperature estimation data TD-3 at the rotation speed of the fan 52 closest to the rotation speed of the fan 52 when the control program stored in the storage unit 53 is debugged, when the control program is tested, or when the control system 1 is operated. The temperature calculation unit 55 may select, from among a plurality of pieces of temperature estimation data TD-3 stored in the storage unit 53, two or more pieces of temperature estimation data TD-3 at the rotation speed close to the rotation speed of the fan 52, may calculate the arithmetic mean or geometric mean of the selected two or more pieces of temperature estimation data TD-3 to obtain new temperature estimation data. TD-3', and may store the temperature estimation data TD-3' in the storage unit 53.

In the third embodiment, the temperature calculation unit 55 receives input of the ambient temperature AT via the I/O units 5B connected to the temperature sensor, stores the received ambient temperature AT in the storage unit 53, and then uses the received ambient temperature AT as well as the selected temperature estimation data TD-3 or the newly calculated temperature estimation data TD-3' to calculate the internal temperature IT of the CPU unit 5A, which indicates the temperature inside the unit. In this manner, in the third embodiment, the temperature calculation unit 55 selects the temperature estimation data TD-3 or newly calculates the temperature estimation data TD-3' on the basis of the rotation speed of the fan 52 and calculates the internal temperature IT of the CPU unit 5A on the basis of, in addition to the rotation speed of the fan 52, the ambient temperature AT and the selected temperature estimation data TD-3 or newly calculated temperature estimation data TD-3'.

In the third embodiment, the CPU 51 in the CPU unit 5A performs similar processes to those in the first embodiment except for the processes at step ST2-3 and step ST4-3. In the third embodiment, the CPU 51 in the CPU unit 5A measures the rotation speed of the fan 52 when the control program is debugged or tested or when the control system 1 is operated, and then it stores the rotation speed in the storage unit 53 (step ST2-3). In the third embodiment, the storage unit 53 has a memory area in which the rotation speed of the fan 52 can be stored, and the CPU 51 overwrites the rotation speed of the fan 52 into the memory area of the storage unit 53.

The CPU 51 in the CPU unit 5A receives input of the ambient temperature AT via the I/O units 5B connected to the temperature sensor and receives the running time RT input via the input unit 65 (step ST3). Thereafter, the CPU 51 reads the rotation speed of the fan 52 and the temperature estimation data TD-3 stored in the storage unit 53, and then it selects the temperature estimation data TD-3 at the rotation speed of the fan 52 closest to the rotation speed of the fan 52 stored in the storage unit 53 or calculates new temperature estimation data TD-3' (step ST4-3). In a similar manner to the first embodiment, the CPU 51 in the CPU unit 5A calculates the internal temperature IT of the CPU unit 5A (step ST5) and reads the fan life data LD and the remaining life expectancy data LED (step ST6). Then, the CPU 51 calculates the remaining life expectancy LE of the fan 52 (step ST7).

The CPU unit 5A according to the third embodiment includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the rotation speed of the fan 52 and also functions as the life prediction unit 56 that calculates the remaining life expectancy LE of the fan 52 on the basis of the fan life data LD and the internal temperature IT of the CPU unit 5A calculated by the temperature calculation unit 55. Thus, in a similar manner to the first embodiment, by receiving from the input unit 65, before the control system 1 starts operating, input of the running time RT for which the control unit 5 is scheduled to operate when the control system 1 is operated, the CPU unit 5A can obtain, before the control system 1 starts operating, the remaining life expectancy LE of the fan 52.

Moreover, the temperature calculation unit 55 in the CPU unit 5A calculates the internal temperature IT of the CPU unit 5A on the basis of the rotation speed of the fan 52, the ambient temperature AT outside the CPU unit 5A, and the temperature estimation data TD-3 determined for each rotation speed of the fan 52. Therefore, the CPU unit 5A can accurately calculate the internal temperature IT of the CPU unit 5A.

Fourth Embodiment

Figure 18:
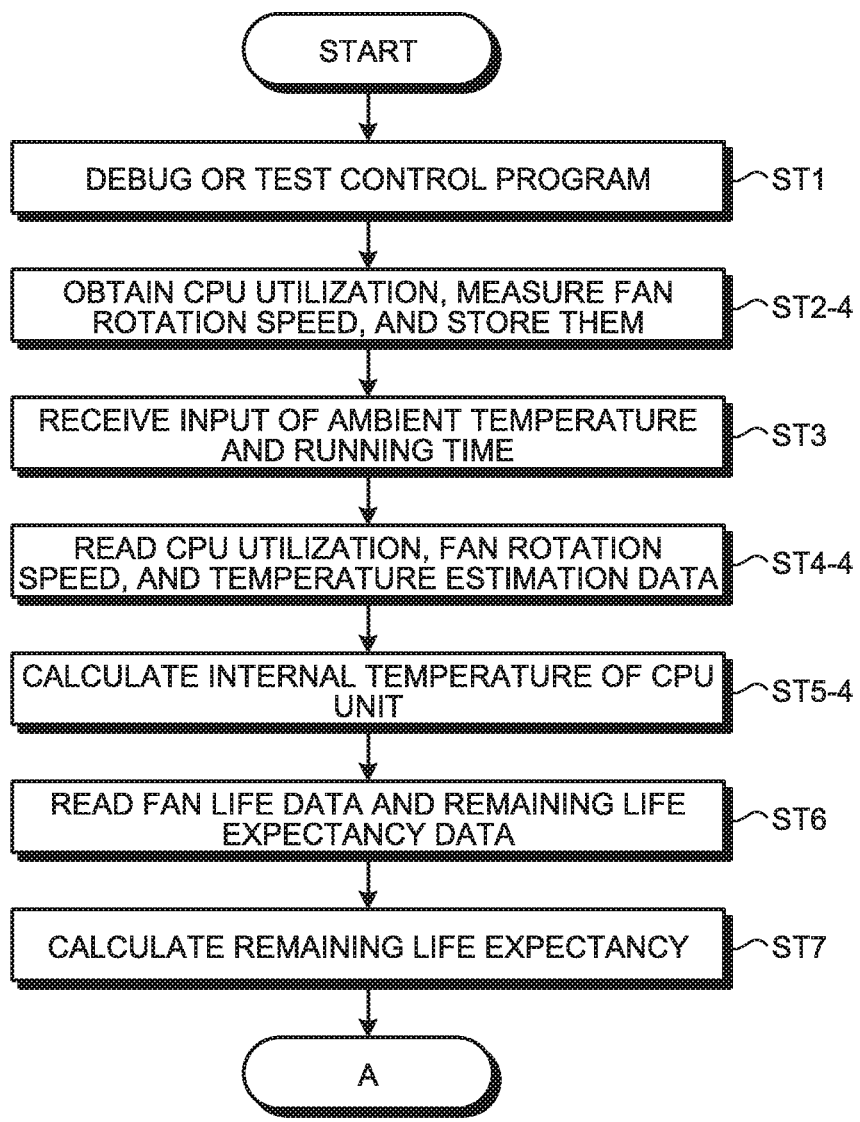
FIG. 18 is a flowchart illustrating an example of the operation for calculating the remaining life expectancy of the fan performed by the CPU in the CPU unit, which is the life prediction device according to the fourth embodiment.

Next, a life prediction device according to a fourth embodiment of the present invention will be described with reference to FIGS. 17 and 18. In FIGS. 17 and 18, the same portions as those in the first embodiment will be given the same reference numerals and a description thereof will be omitted.

The CPU unit 5A, which is the life prediction device according to the fourth embodiment, is the same as that in the first embodiment except for temperature estimation data TD-4 stored in the storage unit 53 and the processes at step ST2-4, step ST4-4, and step ST5-4 illustrated in FIG. 18. The temperature estimation data TD-4 is stored in the storage unit 53 of the CPU unit 5A, which is the life prediction device according to the fourth embodiment, and represents a second relationship illustrated in FIG. 17. Further, the temperature estimation data TD-4 is a data sheet representing the internal temperature IT of the CPU unit 5A corresponding to the utilization of the CPU 51 and the rotation speed of the fan 52 for each ambient temperature AT. The present embodiment exemplifies data for ambient temperature 4A; however, the ambient temperature is not limited thereto. The temperature estimation data TD-4 is data generated by actually measuring the internal temperature IT of the housing of the CPU unit 5A, and at least one piece of temperature estimation data TD-4 is stored in the storage unit 53 when the CPU unit 5A is shipped. In the present invention, however, the utilization of the CPU 51, the ambient temperature AT, and the internal temperature IT may be collected when the CPU unit 5A starts operating, and then the temperature estimation data may be automatically generated by the CPU 51 and stored in the storage unit 53. The temperature estimation data TD-4 illustrated in FIG. 17 exemplifies "4AA1", "4AA2", "4AA3", . . . , as the rotation speed of the fan 52, and "4AB1", "4AB2", "4AB3", . . . , as the utilization of the CPU 51; however, these are not limitations.

In the fourth embodiment, the CPU 51 in the CPU unit 5A performs similar processes to those in the first embodiment except for the processes at step ST2-4, step ST4-4, and step ST5-4. In the fourth embodiment, the CPU 51 in the CPU unit 5A obtains the utilization of the CPU 51 and measures the rotation speed of the fan 52 when the control program is debugged or tested or when the control system 1 is operated, and then it stores them in the storage unit 53 (step ST2-4).

The CPU 51 in the CPU unit 5A receives input of the ambient temperature AT via the I/O units 5B connected to the temperature sensor and receives the running time RT input via the input unit 65 (step ST3). Thereafter, the CPU 51 reads the temperature estimation data TD-4 stored in the storage unit 53 and selects, from among a plurality of pieces of temperature estimation data TD-4 stored in the storage unit 53, the temperature estimation data TD-4 corresponding to the ambient temperature AT closest to the ambient temperature AT input from the input unit 65 (step ST4-4). At step ST4-4, the CPU 51 in the CPU unit 5A reads the utilization of the CPU 51 and the rotation speed of the fan 52 stored in the storage unit 53. The CPU 51 in the CPU unit 5A calculates the internal temperature IT of the CPU unit 5A on the basis of the selected temperature estimation data TD-4 as well as the utilization of the CPU 51 and the rotation speed of the fan 52 that are read (step ST5-4). Then, the CPU 51 in the CPU unit 5A reads the fan life data LD and the remaining life expectancy data LED (step ST6) and, thereafter, calculates the remaining life expectancy LE of the fan 52 (step 17).

The CPU unit 5A according to the fourth embodiment includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the utilization of the CPU 51 and the rotation speed of the fan 52 and also functions as the life prediction unit 56 that calculates the remaining life expectancy LE of the fan 52 on the basis of the fan life data LD and the internal temperature IT of the CPU unit 5A calculated by the temperature calculation unit 55. Thus, in a similar manner to the first embodiment, by receiving from the input unit 65, before the control system 1 starts operating, input of the running time RT for which the control unit 5 is scheduled to operate when the control system 1 is operated, the CPU unit 5A can obtain, before the control system 1 starts operating, the remaining life expectancy LE of the fan 52.

Moreover, the temperature calculation unit 55 in the CPU unit 5A calculates the internal temperature IT of the CPU unit 5A on the basis of the temperature estimation data TD-4 that represents the internal temperature IT of the CPU unit 5A corresponding to the utilization of the CPU 51 and the rotation speed of the fan 52. Therefore, the CPU unit 5A can accurately calculate the internal temperature IT of the CPU unit 5A.

Fifth Embodiment

Figure 20:
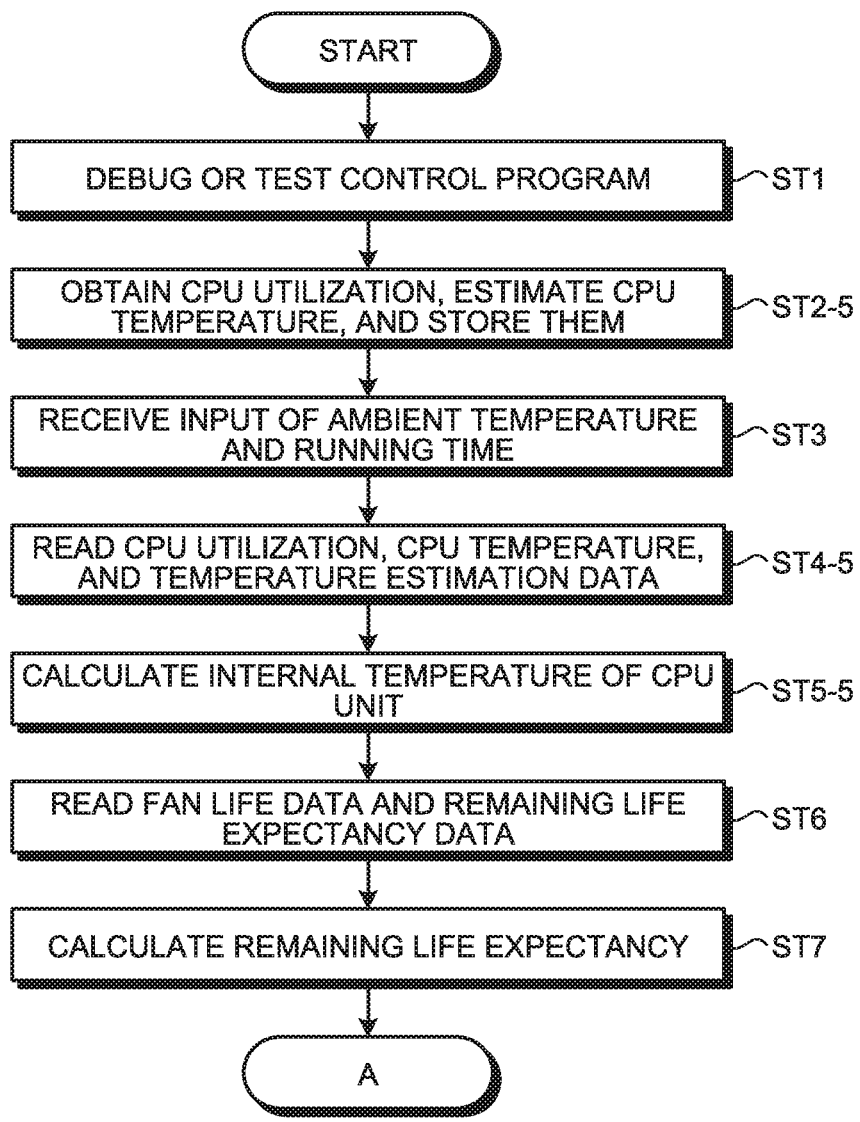
FIG. 20 is a flowchart illustrating an example of the operation for calculating the remaining life expectancy of the fan performed by the CPU in the CPU unit, which is the life prediction device according to the fifth embodiment.

Next, a life prediction device according to a fifth embodiment of the present invention will be described with reference to FIGS. 19 and 20. In FIGS. 19 and 20, the same portions as those in the first embodiment will be given the same reference numerals and a description thereof will be omitted.

The CPU unit 5A, which is the life prediction device according to the fifth embodiment, is the same as that in the first embodiment except for temperature estimation data TD-5 stored in the storage unit 53 and the processes at step ST2-5, step ST4-5, and step ST5-5 illustrated in FIG. 20. The temperature estimation data TD-5 illustrated in FIG. 19 and stored in the storage unit 53 of the CPU unit 5A, which is the life prediction device according to the fifth embodiment, is a data sheet representing the internal temperature IT of the CPU unit 5A corresponding to the temperature of the CPU 51 and the utilization of the CPU 51 for each ambient temperature AT. The present embodiment exemplifies data for ambient temperature 5A; however, the ambient temperature is not limited thereto. The temperature estimation data TD-5 is data generated by actually measuring the internal temperature IT of the housing of the CPU unit 5A, and at least one piece of temperature estimation data TD-5 is stored in the storage unit 53 when the CPU unit 5A is shipped. In the present invention, however, the utilization of the CPU 51, the ambient temperature AT, and the internal temperature IT may be collected when the CPU unit 5A starts operating, and then the temperature estimation data may be automatically generated by the CPU 51 and stored in the storage unit 53. The temperature estimation data TD-5 illustrated in FIG. 19 exemplifies "5AA1", "5AA2", "5AA3", as the temperature of the CPU 51, and "5AB1", "5AB2" "5AB3", . . . , as the utilization of the CPU 51; however, these are not limitations.

In the fifth embodiment, the CPU 51 in the CPU unit 5A performs similar processes to those in the first embodiment except for the processes at step ST2-5, step ST4-5, and step ST5-5. In the fifth embodiment, the CPU 51 in the CPU unit 5A obtains the utilization of the CPU 51 and estimates the temperature of the CPU 51 when the control program is debugged or tested or when the control system 1 is operated, and then it stores them in the storage unit 53 (step ST2-5).

The CPU 51 in the CPU unit 5A receives input of the ambient temperature AT via the I/O units 5B connected to the temperature sensor and receives the running time RT input via the input unit 65 (step ST3). Thereafter, the CPU 51 reads the temperature estimation data TD-5 stored in the storage unit 53 and selects, from among a plurality of pieces of temperature estimation data TD-5 stored in the storage unit 53, the temperature estimation data TD-5 corresponding to the ambient temperature AT closest to the ambient temperature AT input from the input unit 65 (step ST4-5). At step ST4-5, the CPU 51 in the CPU unit 5A reads the temperature of the CPU 51 and the utilization of the CPU 51 stored in the storage unit 53. The CPU 51 in the CPU unit 5A calculates the internal temperature IT of the CPU unit 5A on the basis of the selected temperature estimation data TD-5 as well as the temperature of the CPU 51 and the utilization of the CPU 51 that are read (step ST5-5). Then, the CPU 51 in the CPU unit 5A reads the fan life data LD and the remaining life expectancy data LED (step ST6) and, thereafter, calculates the remaining life expectancy LE of the fan 52 (step ST7).

The CPU unit 5A according to the fifth embodiment includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the temperature of the CPU 51 and the utilization of the CPU 51 and also functions as the life prediction unit 56 that calculates the remaining life expectancy LE of the fan 52 on the basis of the fan life data LD and the internal temperature IT of the CPU unit 5A calculated by the temperature calculation unit 55. Thus, in a similar manner to the first embodiment, by receiving from the input unit 65, before the control system 1 starts operating, input of the running time RT for which the control unit 5 is scheduled to operate when the control system 1 is operated, the CPU unit 5A can obtain, before the control system 1 starts operating, the remaining life expectancy LE of the fan 52.

Moreover, the temperature calculation unit 55 in the CPU unit 5A calculates the internal temperature IT of the CPU unit 5A on the basis of the temperature estimation data TD-5 that represents the internal temperature IT of the CPU unit 5A corresponding to the temperature of the CPU 51 and the utilization of the CPU 51. Therefore, the CPU unit 5A can accurately calculate the internal temperature IT of the CPU unit 5A.

Sixth Embodiment

Figure 22:
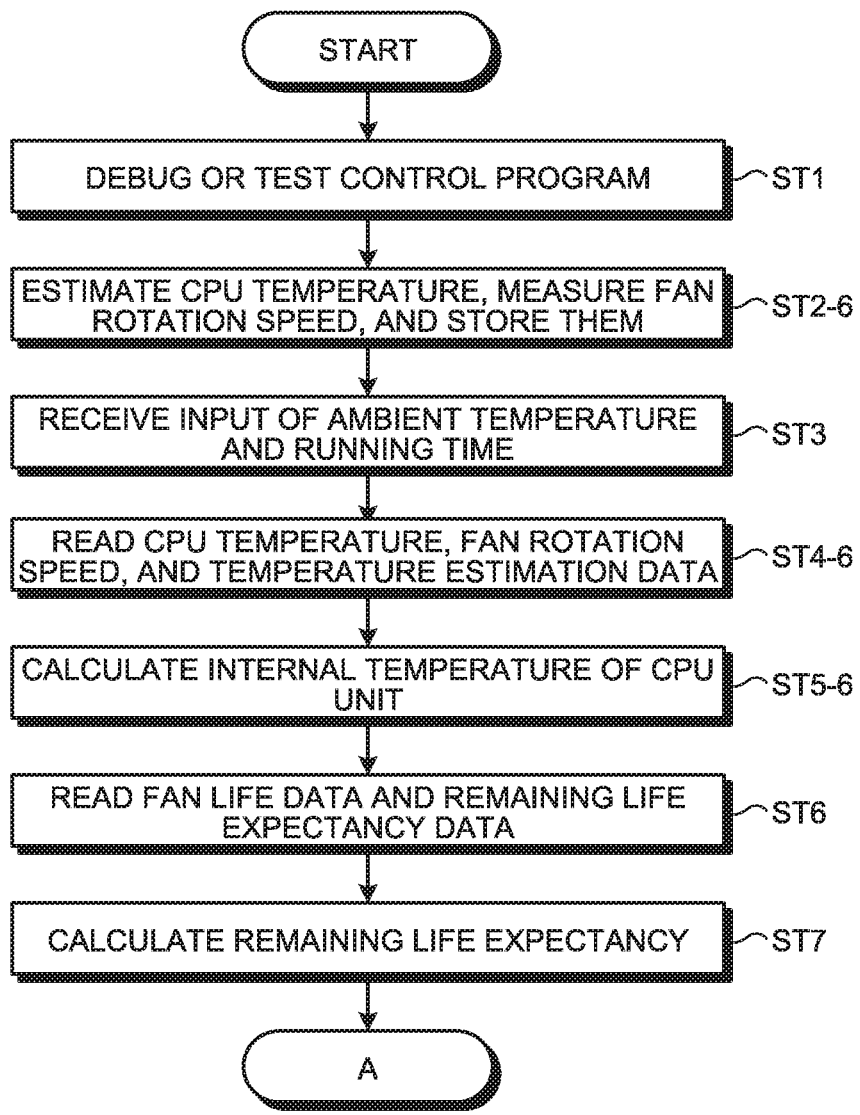
FIG. 22 is a flowchart illustrating an example of the operation for calculating the remaining life expectancy of the fan performed by the CPU in the CPU unit, which is the life prediction device according to the sixth embodiment.

Next, a life prediction device according to a sixth embodiment of the present invention will be described with reference to FIGS. 21 and 22. In FIGS. 21 and 22, the same portions as those in the first embodiment will be given the same reference numerals and a description thereof will be omitted.

The CPU unit 5A, which is the life prediction device according to the sixth embodiment, is the same as that in the first embodiment except for temperature estimation data TD-6 stored in the storage unit 53 and the processes at step ST2-6, step ST4-6, and step ST5-6 illustrated in FIG. 22. The temperature estimation data TD-6 illustrated in FIG. 21 and stored in the storage unit 53 of the CPU unit 5A, which is the life prediction device according to the sixth embodiment, is a data sheet representing the internal temperature IT of the CPU unit 5A corresponding to the rotation speed of the fan 52 and the temperature of the CPU 51 for each ambient temperature AT. The present embodiment exemplifies data for ambient temperature 6A; however, the ambient temperature is not limited thereto. The temperature estimation data TD-6 is data generated by actually measuring the internal temperature IT of the housing of the CPU unit 5A, and at least one piece of temperature estimation data TD-6 is stored in the storage unit 53 when the CPU unit 5A is shipped. In the present invention, however, the utilization of the CPU 51, the ambient temperature AT, and the internal temperature IT may be collected when the CPU unit 5A starts operating, and then the temperature estimation data may be automatically generated by the CPU 51 and stored in the storage unit 53. The temperature estimation data TD-6 illustrated in FIG. 21 exemplifies "6AA1", "6AA2", "6AA3", . . . , as the rotation speed of the fan 52, and "6AB1", "6AB2", "6AB3", . . . , as the temperature of the CPU 51; however, these are not limitations.

In the sixth embodiment, the CPU 51 in the CPU unit 5A performs similar processes to those in the first embodiment except for the processes at step ST2-6, step ST4-6, and step ST5-6. In the sixth embodiment, the CPU 51 in the CPU unit 5A estimates the temperature of the CPU 51 and measures the rotation speed of the fan 52 when the control program is debugged or tested or when the control system 1 is operated, and then it stores them in the storage unit 53 (step ST2-6). The CPU 51 in the CPU unit 5A receives input of the ambient temperature AT via the I/O units SIB connected to the temperature sensor and receives the running time RT input via the input unit 65 (step ST3). Thereafter, the CPU 51 reads the temperature estimation data TD-6 stored in the storage unit 53 and selects, from among a plurality of pieces of temperature estimation data TD-6 stored in the storage unit 53, the temperature estimation data TD-6 corresponding to the ambient temperature AT closest to the ambient temperature AT input from the input unit 65 (step ST4-6). At step ST4-6, the CPU 51 in the CPU unit 5A reads the rotation speed of the fan 52 and the temperature of the CPU 51 stored in the storage unit 53. The CPU 51 in the CPU unit 5A calculates the internal temperature IT of the CPU unit 5A on the basis of the selected temperature estimation data TD-6 as well as the rotation speed of the fan 52 and the temperature of the CPU 51 that are read (step ST5-6). Then, the CPU 51 in the CPU unit 5A reads the fan life data LD and the remaining life expectancy data LED (step ST6) and, thereafter, calculates the remaining life expectancy LE of the fan 52 (step ST7).

The CPU unit 5A according to the sixth embodiment includes the storage unit 53 that stores the fan life data LD that indicates the life of the fan 52 relative to temperature. The CPU 51 in the CPU unit 5A functions as the temperature calculation unit 55 that calculates the internal temperature IT of the CPU unit 5A on the basis of the rotation speed of the fan 52 and the temperature of the CPU 51 and also functions as the life prediction unit 56 that calculates the remaining life expectancy LE of the fan 52 on the basis of the fan life data LD and the internal temperature IT of the CPU unit 5A calculated by the temperature calculation unit 55. Thus, in a similar manner to the first embodiment, by receiving from the input unit 65, before the control system 1 starts operating, input of the running time RT for which the control unit 5 is scheduled to operate when the control system 1 is operated, the CPU unit 5A can obtain, before the control system 1 starts operating, the remaining life expectancy LE of the fan 52.

Moreover, the temperature calculation unit 55 in the CPU unit 5A calculates the internal temperature IT of the CPU unit 5A on the basis of the temperature estimation data TD-6 that represents the internal temperature IT of the CPU unit 5A corresponding to the rotation speed of the fan 52 and the temperature of the CPU 51. Therefore, the CPU unit 5A can accurately calculate the internal temperature IT of the CPU unit 5A.

In the first to sixth embodiments, the temperature estimation data TD-1, TD-2, TD-3, TD-4, TD-5, and TD-6, the fan life data LD, and the remaining life expectancy data LED are stored in the storage unit 53 of the CPU unit 5A; however, in the present invention, at least some of the temperature estimation data TD-1, TD-2, TD-3, TD-4, TD-5, and TD-6, the fan life data LD, and the remaining life expectancy data LED may be stored in a recording medium connected to the network N. A storage device of the computer 6 can be used as the recording medium connected to the network N; however, the recording medium connected to the network N is not limited thereto.

Moreover, in the first to sixth embodiments, an example has been described in which the life prediction device that calculates the remaining life expectancy 18 of the fan 52 is the CPU unit 5A and the central processing unit is the CPU 51 in the CPU unit 5A; however, in the present invention, the life prediction device is not limited to the CPU unit 5A. This means that, in the present invention, the life prediction device may be any type of device, such as the I/O unit 5B of the control unit 5 that is an FA device.

Seventh Embodiment

Figure 23:
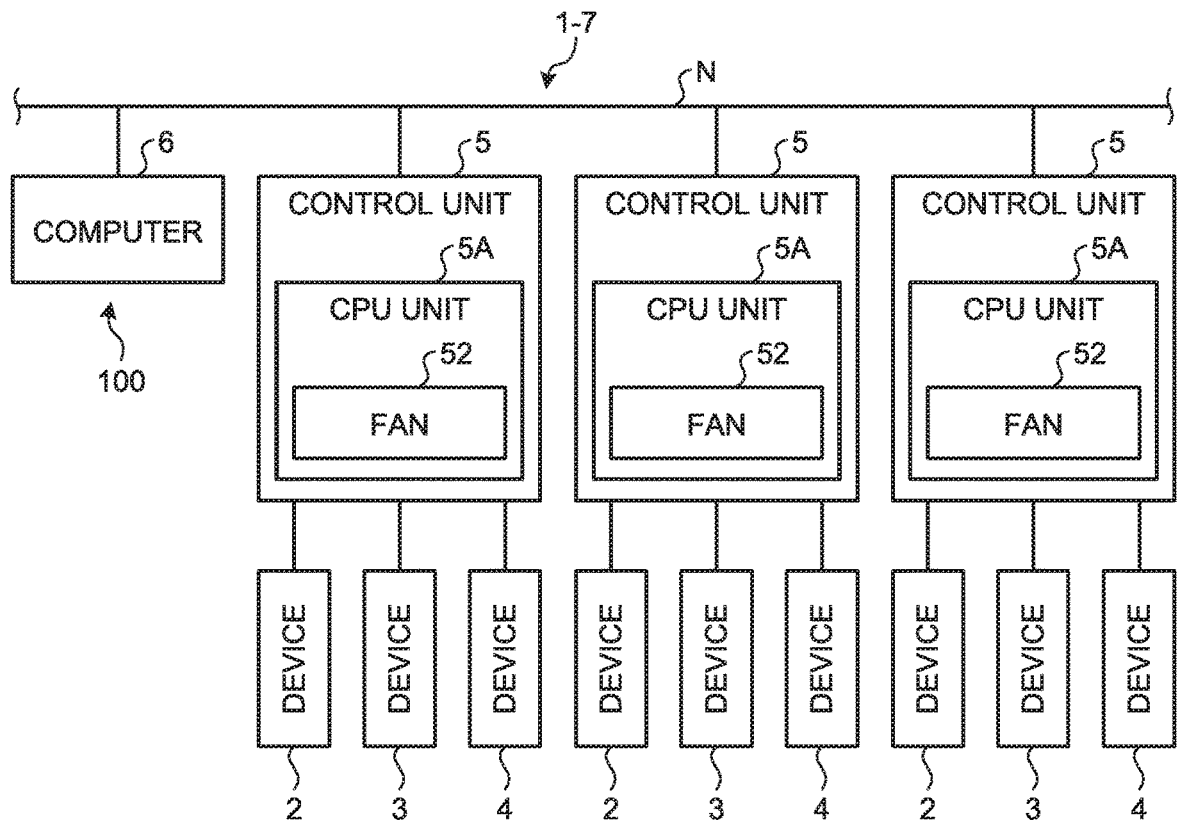
FIG. 23 is a diagram illustrating a configuration of a control system that includes a computer that constitutes a life prediction device according to a seventh embodiment.
Figure 24:
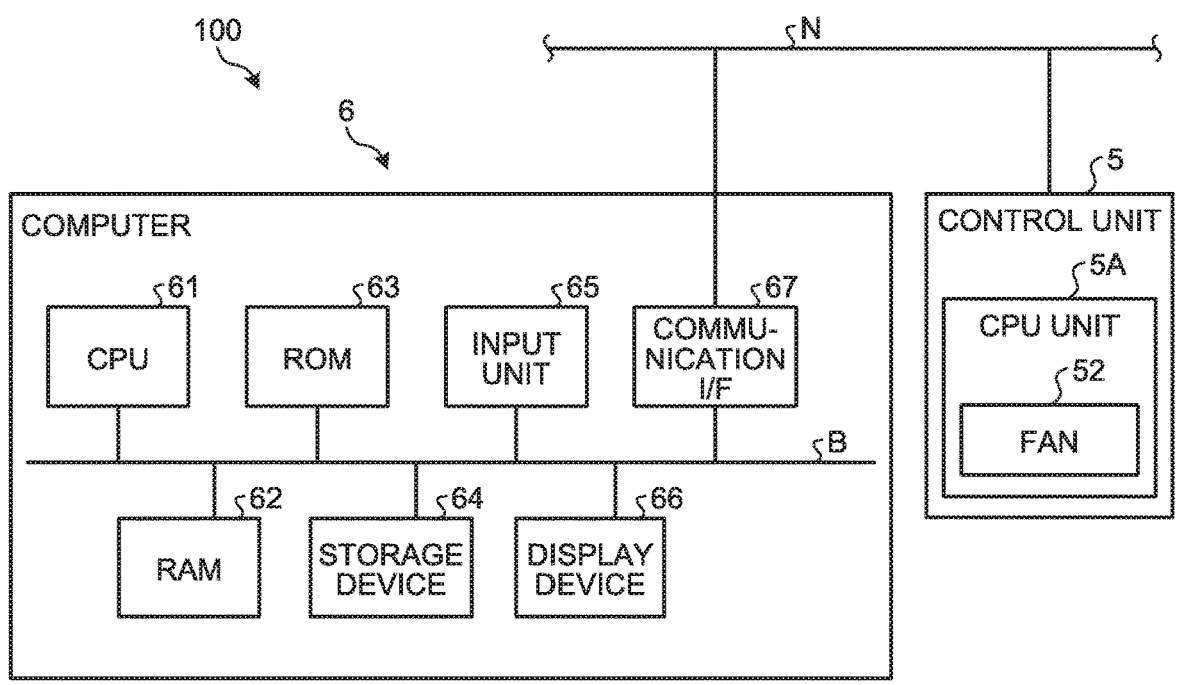
FIG. 24 is a diagram illustrating the hardware configuration of the computer that constitutes the life prediction device according to the seventh embodiment.
Figure 25:
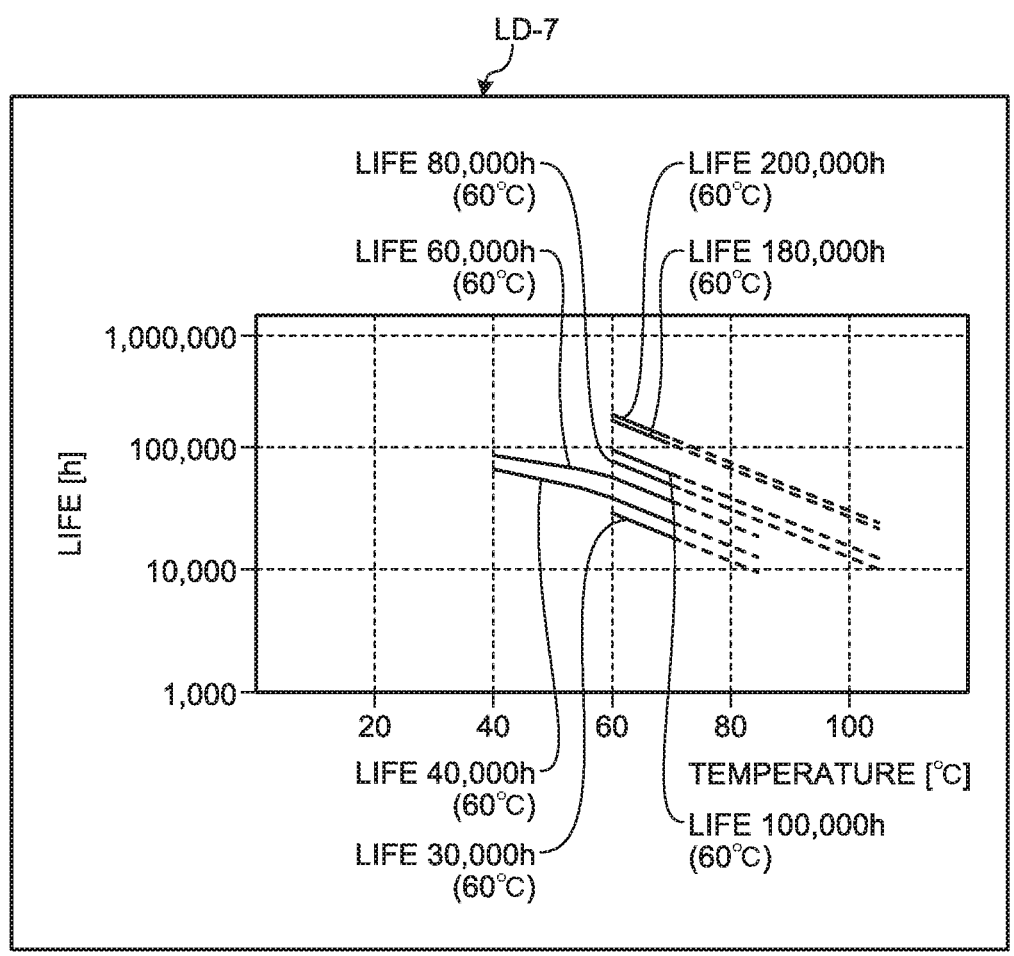
FIG. 25 is a diagram illustrating an example of fan life data stored in a storage device of the computer that constitutes the life prediction device according to the seventh embodiment.

Next, a life prediction device 100 according to a seventh embodiment of the present invention will be described with reference to FIGS. 23, 24, and 25. In FIGS. 23, 24, and 25, the same portions as those in the first embodiment will be given the same reference numerals and a description thereof will be omitted.

In the seventh embodiment, the life prediction device 100 is constituted by the computer 6. In the seventh embodiment, the computer 6 calculates the life of the fan 52 of the CPU unit 5A in the control unit 5. The computer 6 executes a computer program and includes, as illustrated in FIG. 24, a CPU 61, a RAM 62, a ROM 63, a storage device 64, the input unit 65, a display device 66, and a communication interface 67. The CPU 61, the RAM 62, the ROM 63, the storage device 64, the input unit 65, the display device 66, and the communication interface 67 are connected to one another via a bus B.

The CPU 61 executes programs stored in the ROM 63 and the storage device 61 by using the RAM 62 as a work area. The program stored in the RCM 63 is a Basic Input/Output System (BIOS) or a Unified Extensible Firmware Interface (UEFI), but the program stored in the ROM 63 is not limited to a BIOS or a UEFI. In the seventh embodiment, the program stored in the storage device 64 is an operating system program and an engineering tool program, but the program stored in the storage device 64 is not limited to an operating system program and an engineering tool program. In the seventh embodiment, the storage device 64 is an SSD or an HDD, but the storage device 64 is not limited to an SSD or an HDD.

The input unit 65 receives user's input operations and external information. The display device 66 displays the remaining life expectancy LE of the fan 52 and like. In the seventh embodiment, the display device 66 is a liquid crystal display device, but it is not limited to a liquid crystal display device. The communication interface 67 communicates with the control unit 5 via the network N.

In the seventh embodiment, the CPU 61 reads and executes the computer program stored in the storage device 64 to implement the functions of the temperature calculation unit 55 and the life prediction unit 56. The computer program is implemented in software, firmware, or a combination of software and firmware. The function of the storage unit 53 is implemented by the storage device 64. The function of the user notification unit 54 implemented by the display device 66.

The CPU 61 in the computer 6 obtains, from the CPU unit 5A in the control unit 5, at least one of the utilization of the CPU 51, the temperature of the CPU 51, and the rotation speed of the fan 52 when the control program is debugged or tested or when a control system 1-7 is operated. In the seventh embodiment, the control system 1-7 includes a plurality of control units 5 and the CPU 61 in the computer 6 obtains, via the network N, the rotation speed of the fan 52 of the CPU unit 5A in each of the control units 5 and calculates the remaining life expectancy LE of the fan 52 of the CPU unit 5A in each of the control units 5. In the seventh embodiment, the storage device 64 functioning as the storage unit 53 stores fan life data LD-7 illustrated in FIG. 25. As illustrated in FIG. 25, the fan life data LD-7 includes data representing the life of the fan 52 of the CPU unit 5A in each of the control units 5. In other words, the fan life data LD-7 includes a plurality of pieces of data representing the life of the fan 52. The fan life data LD 7 is input and stored in the storage unit 53 via the input unit 65. In the seventh embodiment, the computer 6 calculates the internal temperature IT of each of the CPU units 5A and calculates the remaining life expectancy IE of the fan 52 of the CPU unit 5A in each of the control units 5 in a similar manner to any one of the first to sixth embodiments.

The computer 6 according to the seventh embodiment includes the storage device 64 that stores the fan life data LD-7 that indicates the life of the fan 52 relative to temperature. The CPU 61 in the computer 6 functions as the temperature calculation unit 55 that calculates the internal temperature IT of the CPU unit 5A on the basis of at least one of the utilization of the CPU 51, the temperature of the CPU 51, and the rotation speed of the fan 52 and also functions as the life prediction unit 56 that calculates the remaining life expectancy LE of the fan 52 on the basis or the fan life data LD-7 and the internal temperature IT of the CPU unit 5A calculated by the temperature calculation unit 55. Thus, in a similar manner to the first embodiment, by receiving from the input unit 65, before the control system 1-7 starts operating, input of the running time RT for which the control unit 5 is scheduled to operate when the control system 1-7 is operated, the computer 6 can obtain, before the control system 1-7 starts operating, the remaining life expectancy LE of the fan 52 of the CPU unit 5A in the control unit 5.

Moreover, because the computer 6 according to the seventh embodiment calculates the remaining life expectancy LE of the fans 52 of the CPU units 5A in a plurality of the control units 5, the computer 6 can obtain the remaining life expectancy LE for a plurality of the fans 52.

Moreover, in the seventh embodiment, the computer 6 that constitutes the life prediction device 100 generates the control program for the CPU unit 5A in the control unit 5 and transmits the control program to the CPU unit 5A in the control unit 5; however, this is not a limitation. The computer 6 may be a computer for preventive maintenance that collects data for preventive maintenance and transmits it to an upper-level system.

The configurations in the foregoing embodiments represent some examples of an aspect of the present invention, and they can be combined with other publicly known technologies and partially omitted or modified without departing from the spirit of the present invention.

REFERENCE SIGNS LIST

5A CPU unit (life prediction device or device provided with a fan); 6 computer; 51 central processing unit (CPU); 52 fan; 55 temperature calculation unit; 56 life prediction unit; 65 input unit; 100 life prediction device; IT internal temperature; AT ambient temperature (external temperature); RT running time; LD, LD-7 fan life data. (life data); LS remaining life expectancy; TD-1, TD-2, TD-3 temperature estimation data (first relationship); TD-4, TD-5, TD-6 temperature estimation data (second relationship).

The invention claimed is:

1. A life prediction device for a fan, the device comprising:
temperature calculation circuitry to calculate an internal temperature of an apparatus provided with the fan;
a memory to store life data indicating a life of the fan relative to the internal temperature of the apparatus; and
life prediction circuitry to calculate a remaining life expectancy of the fan on a basis of the life data and the internal temperature calculated by the temperature calculation circuitry, wherein
the memory stores a plurality of first relationships that are defined for respective utilizations of a central processor that performs arithmetic processing and are relationships between an external temperature of the apparatus provided with the fan and the internal temperature, and
the temperature calculation circuitry selects, from among the plurality of first relationships, two or more first relationships at utilizations close to a utilization of the central processor, calculates an arithmetic mean or a geometric mean of the selected two or more first relationships to obtain a new first relationship, and calculates the internal temperature on a basis of the utilization of the central processor, the external temperature, and the calculated new first relationship.

2. The life prediction device according to claim 1, wherein the life data is data representing a change of the life of the fan in accordance with a change in the temperature.

3. The life prediction device according to claim 2, wherein the life prediction circuitry calculates, on a basis of the life data, the life of the fan in an unused state at the internal temperature calculated by the temperature calculation circuitry and calculates a ratio of a running time of the apparatus provided with the fan to the calculated life of the fan.

4. The life prediction device according to claim 1, wherein the life prediction circuitry calculates, on a basis of the life data, the life of the tan in an unused state at the internal temperature calculated by the temperature calculation circuitry and calculates a ratio of a running time of the apparatus provided with the fan to the calculated life of the fan.

5. The life prediction device according to claim 4, wherein the life prediction circuitry calculates the remaining life expectancy of the fan by using the ratio of the running time of the apparatus provided with the fan to the life of the fan.

6. The life prediction device according to claim 1, comprising a receiver to input the life data to the memory.

7. The life prediction device according to claim 1, comprising user notification circuitry to display the remaining life expectancy of the fan to a user, wherein
the life prediction circuitry determines whether the remaining life expectancy of the fan is less than or equal to a preset value, and,
when the life prediction circuitry determines that the remaining life expectancy of the fan is less than or equal to the preset value, the life prediction circuitry causes the user notification circuitry to display that the remaining life expectancy of the fan is less than or equal to the preset value.

8. A life prediction device for a fan, the device comprising temperature calculation circuitry to calculate an internal temperature of an apparatus provided with the fan;

a memory to store life data indicating a life of the fan relative to the internal temperature of the apparatus; and life prediction circuitry to calculate a remaining life expectancy of the fan on a basis of the life data and the internal temperature calculated by the temperature calculation circuitry, wherein the memory stores a plurality of relationships that are defined for respective temperatures of a central processor that performs arithmetic processing and are relationships between an external temperature of the apparatus provided with the fan and the internal temperature, and the temperature calculation circuitry selects, from among the plurality of relationships, two or more of the relationships at temperatures close to a temperature of the central processor, calculates an arithmetic mean or a geometric mean of the selected two or more of the relationships to obtain a new relationship, and calculates the internal temperature on a basis of the temperature of the central processor, the external temperature, and the calculated new relationship.

9. A life prediction device for a fan, the device comprising:

temperature calculation circuitry to calculate an internal temperature of an apparatus provided with the fan;

a memory to store life data indicating a life of the fan relative to the internal temperature of the apparatus; and life prediction circuitry to calculate a remaining life expectancy of the fan on a basis of the life data and the internal temperature calculated by the temperature calculation circuitry, wherein the memory stores a plurality of relationships that are defined for respective rotation speeds of the fan and are relationships between an external temperature of the apparatus provided with the fan and the internal temperature, and the temperature calculation circuitry selects, from among the plurality of relationships, two or more of the relationships at rotation speeds close to a rotation speed of the fan, calculates an arithmetic mean or a geometric mean of the selected two or more of the relationships to obtain a new relationship, and calculates the internal temperature on a basis of the rotation speed of the fan, the external temperature, and the calculated new relationship.

* * * * *